(12) United States Patent
Choi et al.

(10) Patent No.: US 10,852,729 B2
(45) Date of Patent: Dec. 1, 2020

(54) MOVING ROBOT AND CONTROL METHOD THEREOF

(71) Applicant: LG ELECTRONICS INC., Seoul (KR)

(72) Inventors: Hyukdoo Choi, Seoul (KR); Sunggil Park, Seoul (KR); Dongmyung Shin, Seoul (KR); Junghyun Lee, Seoul (KR); Hyeongshin Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 382 days.

(21) Appl. No.: 15/877,677

(22) Filed: Jan. 23, 2018

(65) Prior Publication Data

US 2018/0210445 A1    Jul. 26, 2018

(30) Foreign Application Priority Data

Jan. 25, 2017 (KR) ........................ 10-2017-0012318

(51) Int. Cl.
*G05D 1/00* (2006.01)
*G05D 1/02* (2020.01)

(52) U.S. Cl.
CPC ......... *G05D 1/0088* (2013.01); *G05D 1/0044* (2013.01); *G05D 1/0214* (2013.01);
(Continued)

(58) Field of Classification Search
CPC .. G05D 1/0088; G05D 1/0044; G05D 1/0214; G05D 1/0221; G05D 1/0238; G05D 1/0246; G05D 1/0255; G05D 1/0274
(Continued)

(56) References Cited

U.S. PATENT DOCUMENTS 9,037,294 B2 *  5/2015  Chung ................. G05D 1/0219
                                              700/253
10,108,200 B2 * 10/2018  Etoh ..................... G05D 1/0223
(Continued)

FOREIGN PATENT DOCUMENTS

JP      2008-200770      9/2008
KR      10-1273252       6/2013
(Continued)

OTHER PUBLICATIONS

Hornung et al., Mobile Manipulation in Cluttered Environments with Humanoids: Integrated Perception, Task Planning, and Action Execution. (Year: 2014).*
(Continued)

*Primary Examiner* — Peter D Nolan
*Assistant Examiner* — Luat T Huynh
(74) *Attorney, Agent, or Firm* — Ked & Associates, LLP

(57) ABSTRACT

A moving robot includes a travelling unit to move a main body, an image acquisition unit to acquire an image around the main body, a sensor unit including at least one sensor to sense an obstacle during moving, a storage unit to store information on a location of the sensed obstacle and information on a location of the moving robot, to register, into a map, an obstacle area of the obstacle, and to store an image from the image acquisition unit in the obstacle area, an obstacle acquisition module to determine a final attribute of the obstacle using the attributes of the obstacle obtained based on machine learning, and a control unit to detect attributes of obstacles through the obstacle recognition module if detecting a confinement state by the obstacles and to control the traveling unit to move one of the obstacles.

19 Claims, 35 Drawing Sheets

(52) U.S. Cl.
CPC ......... *G05D 1/0221* (2013.01); *G05D 1/0238* (2013.01); *G05D 1/0246* (2013.01); *G05D 1/0255* (2013.01); *G05D 1/0274* (2013.01); G05D 2201/0203 (2013.01); G05D 2201/0215 (2013.01); *Y10S 901/01* (2013.01); *Y10S 901/47* (2013.01)

(58) Field of Classification Search
USPC .......................................................... 701/26
See application file for complete search history.

(56) References Cited

U.S. PATENT DOCUMENTS

| | | | |
|---|---|---|---|
| 10,111,566 B2* | 10/2018 | Ahn | A47L 9/2826 |
| 10,423,163 B2* | 9/2019 | Choi | B25J 11/0085 |
| 2006/0229774 A1* | 10/2006 | Park | G05D 1/0238 |
| | | | 701/23 |
| 2008/0201014 A1* | 8/2008 | Sonoura | G05D 1/024 |
| | | | 700/250 |
| 2009/0048727 A1 | 2/2009 | Hong et al. | |
| 2017/0215672 A1 | 8/2017 | Watanabe et al. | |
| 2018/0213994 A1* | 8/2018 | Lee | A47L 9/2857 |

FOREIGN PATENT DOCUMENTS

| | | |
|---|---|---|
| KR | 10-1322510 | 10/2013 |
| KR | 10-1362373 | 2/2014 |
| KR | 10-2016-0054565 | 3/2018 |

OTHER PUBLICATIONS

International Search Report dated May 14, 2018 issued in Application No. PCT/KR2018/000761 (with English Translation).

* cited by examiner

FIG. 15
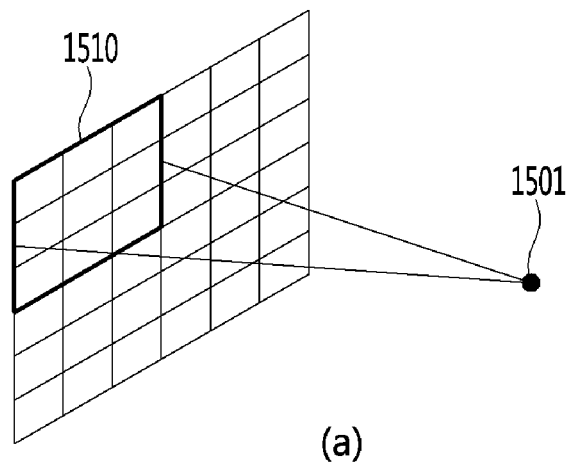
(a)
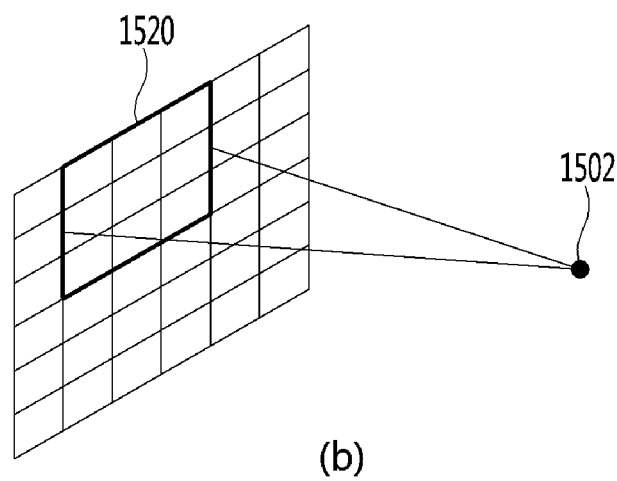
(b)
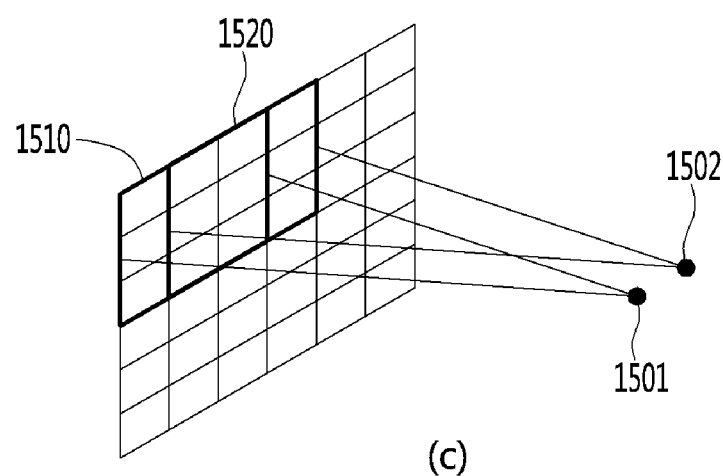
(c)

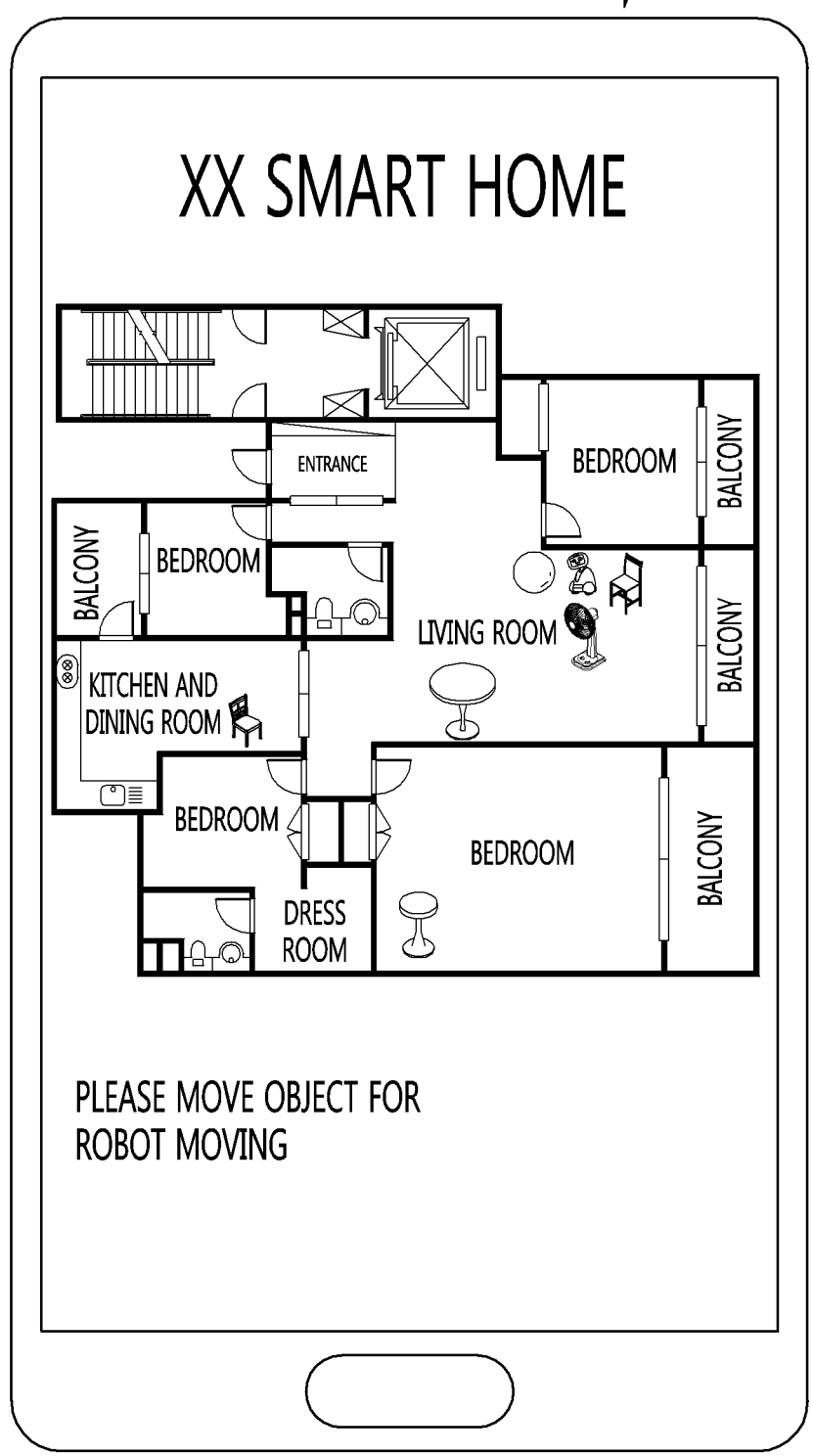

MOVING ROBOT AND CONTROL METHOD THEREOF

CROSS-REFERENCE TO RELATED APPLICATION

This application claims priority under 35 U.S.C. § 119 to Korean Application No. 10-2017-0012318, filed on Jan. 25, 2017, whose entire disclosure is hereby incorporated by reference.

BACKGROUND

1. Field

The present disclosure relates to a moving robot and a control method thereof, and more particularly to a moving robot and a control method thereof, capable of performing recognition and avoidance or confinement escape based on machine learning.

2. Background

A robot has been developed for industrial purposes and served as part of factory automation. With the recent extension of robot application fields, medical robots, space and aircraft robots, or the like have been developed and home robots are being developed. Among them, a robot which can autonomously move is called a moving robot.

A typical example of home moving robots is a robot cleaner. The robot cleaner is a type of home appliance, which sucks in dust or particles while autonomously moving around a specific area to be cleaned.

The moving robot is able to autonomously and freely move. In addition, the moving robot has a plurality of sensors, which are used to avoid an obstacle during travelling, thereby travelling while avoiding the obstacle.

Generally, an infrared sensor or an ultrasonic sensor has been employed to sense the obstacle of the moving robot. The infrared sensor is to determine the presence of the obstacle and the distance from the obstacle based on the quantity of light reflected from the obstacle or time taken to receive the reflected light. The ultrasonic sensor is to determine the distance from the obstacle using the difference between a time point at which an ultrasonic wave is emitted and a time point in which the ultrasonic wave reflected from the obstacle is received, if the ultrasonic wave having a specific period is emitted and the ultrasonic wave reflected from the obstacle is present.

Meanwhile, since obstacle recognition and avoidance significantly exerts an influence on the traveling performance and the cleaning performance of the moving robot, the reliability has to be ensured in the ability of recognizing an obstacle. Further, when the moving robot moves in a narrower space, the moving robot may not detect an avoidance path. Accordingly, to prepare for the case that the avoidance path is not detected, the necessary for an escape algorithm of the moving robot is increased.

BRIEF DESCRIPTION OF THE DRAWINGS

The embodiments will be described in detail with reference to the following drawings in which like reference numerals refer to like elements, and wherein:

FIGS. 12 to 15 are views referred to in explanation of Deep Learning;

FIGS. 30 to 33, 34A, and 34B are views illustrating a third example that the moving robot according to another embodiment of the present disclosure moves an obstacle.

DETAILED DESCRIPTION

Figure 1:
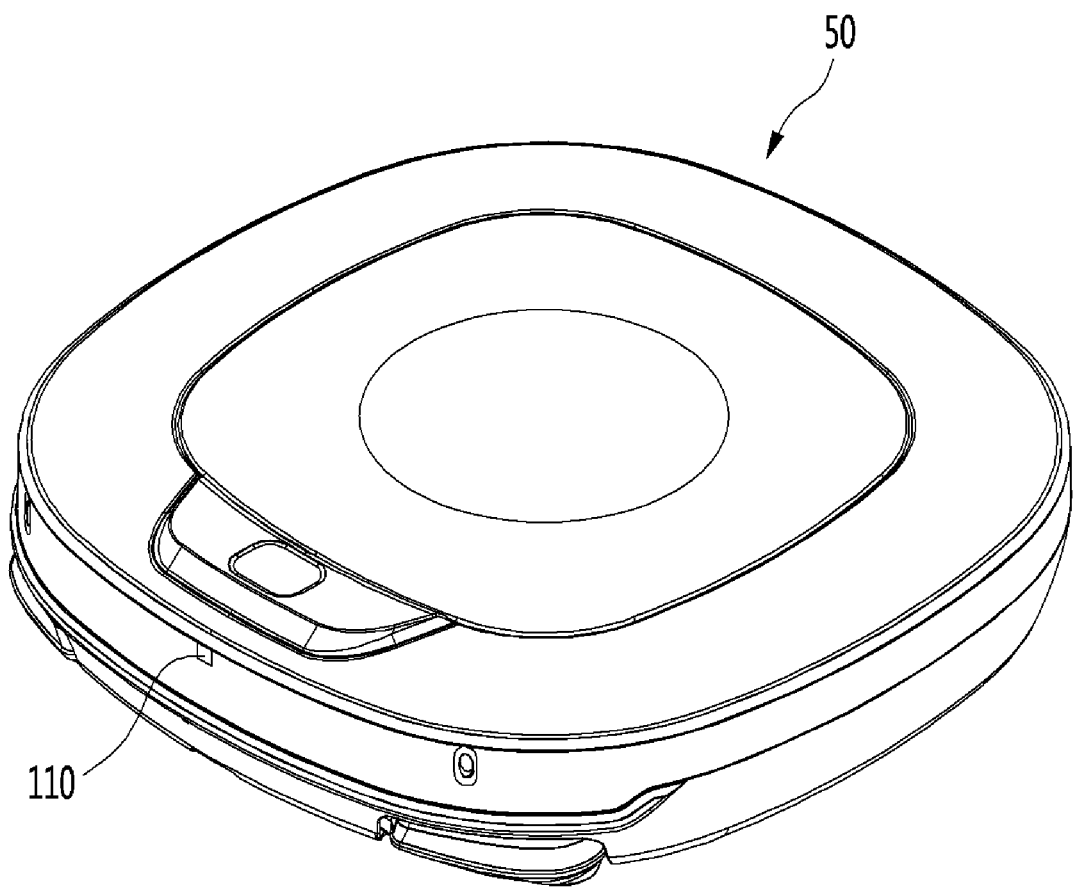
FIGS. 1 and 2 are views illustrating a moving robot according to an embodiment of the present disclosure.

Hereinafter, embodiments are described in more detail with reference to accompanying drawings and regardless of the drawings symbols, same or similar components are assigned with the same reference numerals and thus repetitive for those are omitted. Since the suffixes "module" and "unit" for components used in the following description are given and interchanged for easiness in making the present disclosure, they do not have distinct meanings or functions.

Figure 2:
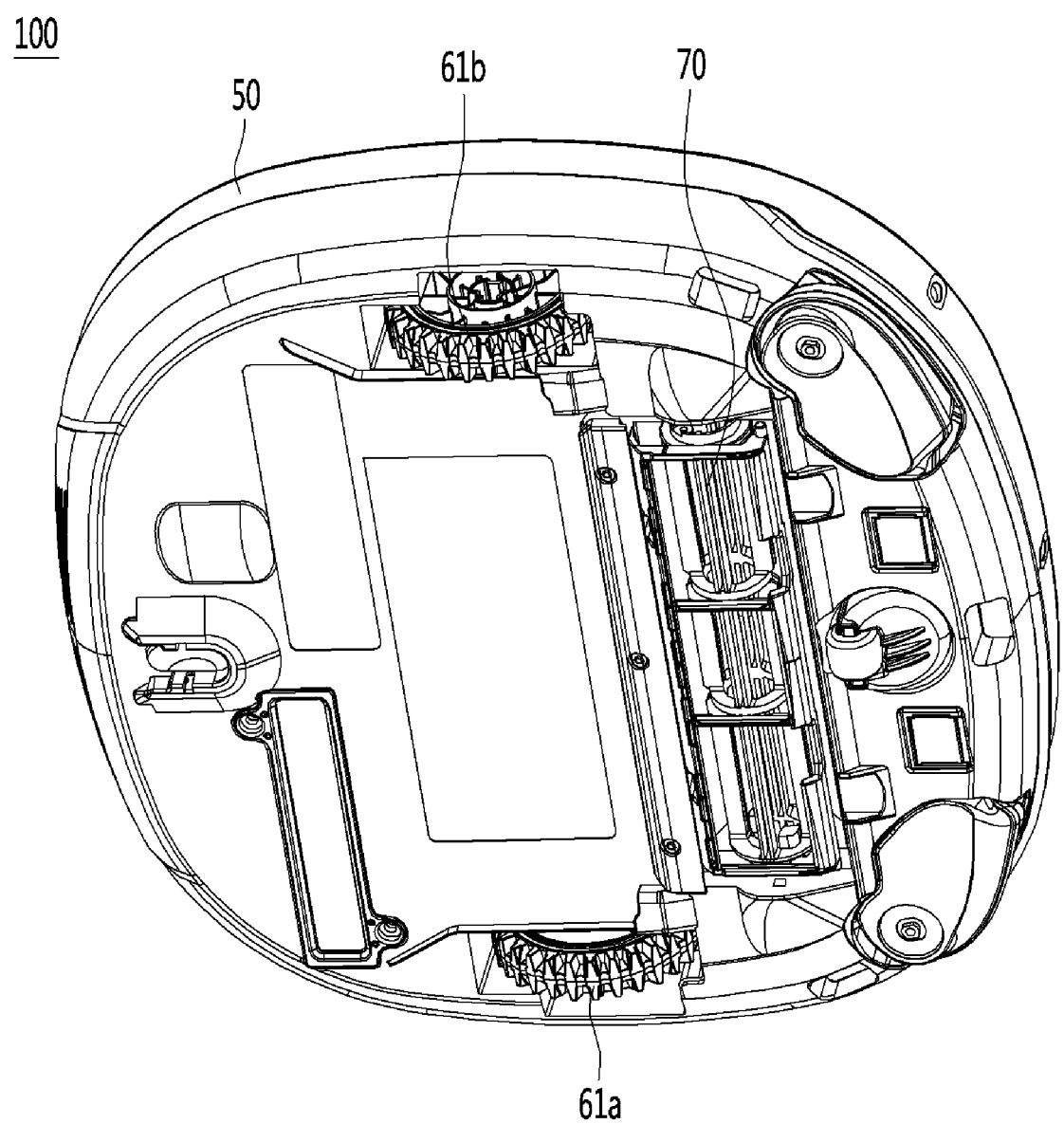

FIGS. 1 and 2 are views illustrating a moving robot according to an embodiment of the present disclosure. Referring to FIGS. 1 and 2, a moving robot 100 may include a main body 50, a left wheel 61a, a right wheel 61b, and a suction unit 70. In particular, the moving robot 100 may include an image acquisition unit 110 including a depth sensor and formed on an upper front surface thereof. In addition, the moving robot 100 may include an RGB sensor 113.

The left wheel 61*a* and the right wheel 61*b* may drive the main body 50. As the left wheel 61*a* and the right wheel 61*b* are rotated by a traveling unit, the suction unit 70 may suck foreign matters such as dust or wastes. The suction unit (or suction head) 70 may be provided in the main body 50 to suck dust from a floor. The suction unit 70 may further include a filter (not illustrated) to collect foreign matters from an airflow which is sucked and a foreign matter receiver (not illustrated) in which the foreign matters collected by the filter are accumulated.

Figure 3:
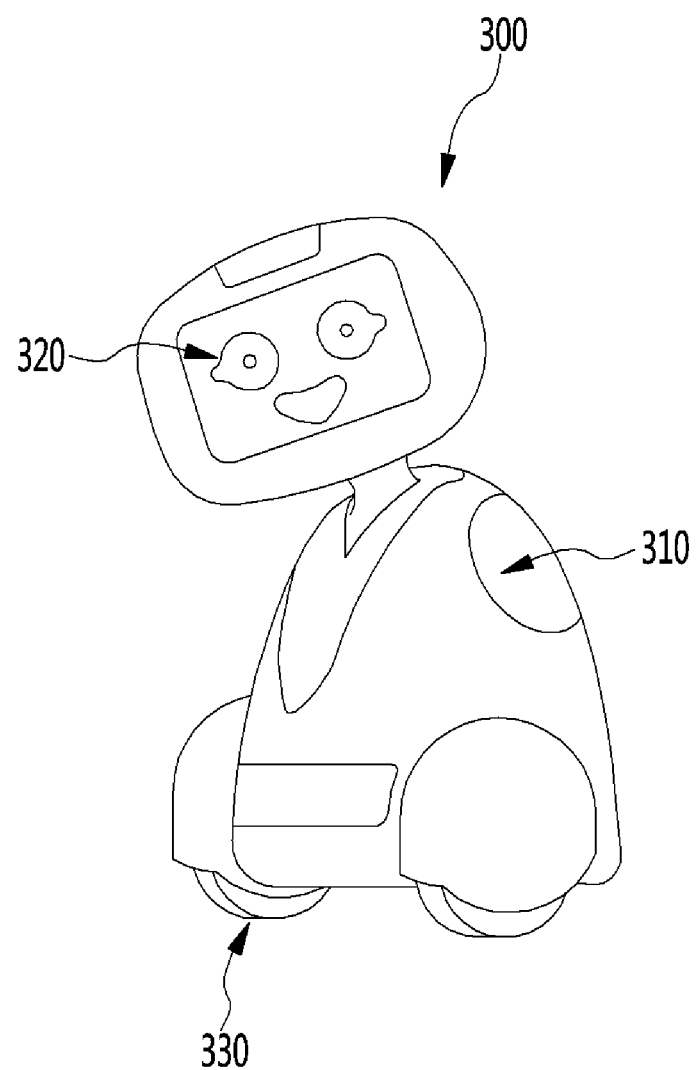
FIG. 3 is a view illustrating a moving robot according to another embodiment of the present disclosure.

FIG. 3 is a view illustrating a moving robot according to another embodiment of the present disclosure. As illustrated in FIG. 3, a moving robot 300 according to another embodiment of the present disclosure may include a main body 310, a display unit 320, and a traveling unit 330.

The main body 310 of the moving robot 300 illustrated in FIG. 3 has a length higher than that of the moving robot 100 described with reference to FIGS. 1 and 2, so that the moving robot 300 is advantageous when moving larger obstacles. Further, although not illustrated in FIG. 3, the main body 310 of the moving robot 300 may include left and right tongs (not illustrated). Accordingly, the moving robot 300 may move an article or an obstacle specified as an obstacle to a specific position.

Hereinafter, a control method of a moving robot (see moving robot illustrated in FIGS. 1 to 3), which recognizes an obstacle, avoids the obstacle, and moves the obstacle under a specific situation, will be described in detail with reference to FIG. 4 and remaining drawings.

Figure 4:
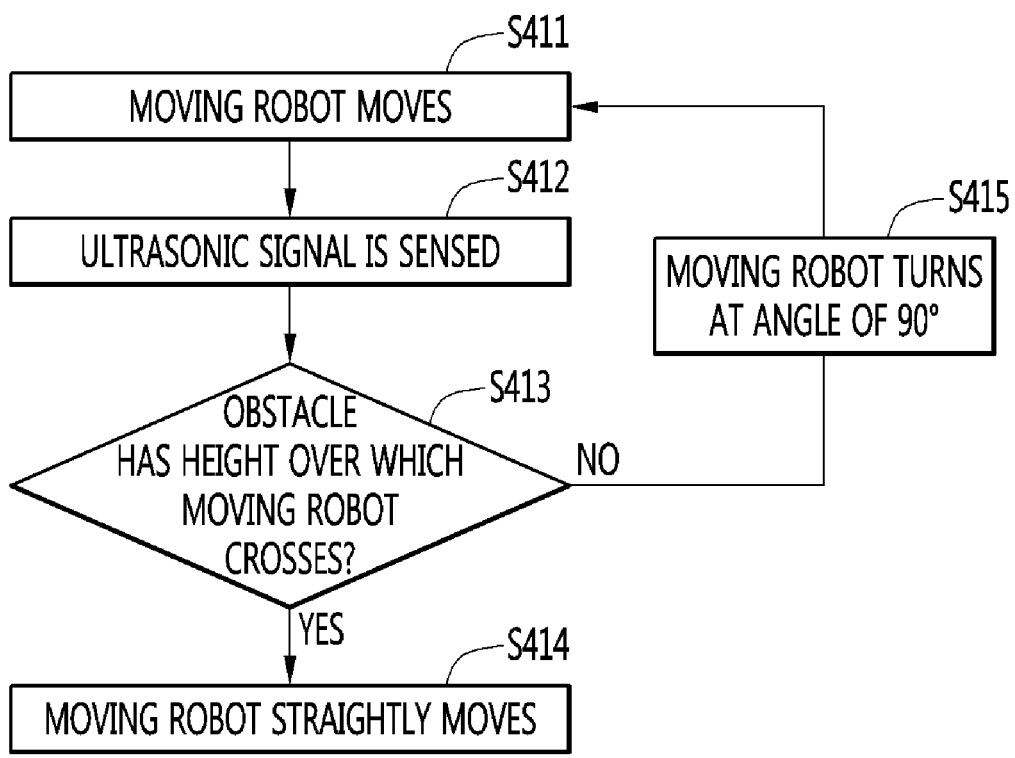
FIG. 4 is a flowchart illustrating a method of detecting and avoiding an obstacle by the moving robot.

FIG. 4 is a flowchart illustrating a method of detecting and avoiding an obstacle by the moving robot. Referring to FIG. 4, the moving robot cleans up by sucking dust and foreign matters while moving (S411).

The moving robot recognizes the presence of the obstacle by sensing an ultrasonic wave reflected from the obstacle through an ultrasonic sensor (S412). The moving robot may determine whether the obstacle has the height over which the moving robot goes (S413). If the moving robot determines the obstacle to have the height over which the moving robot goes, the moving robot straightly moves (S414). Otherwise, the moving robot may turn at an angle of 90° and move (S415).

Figure 5:
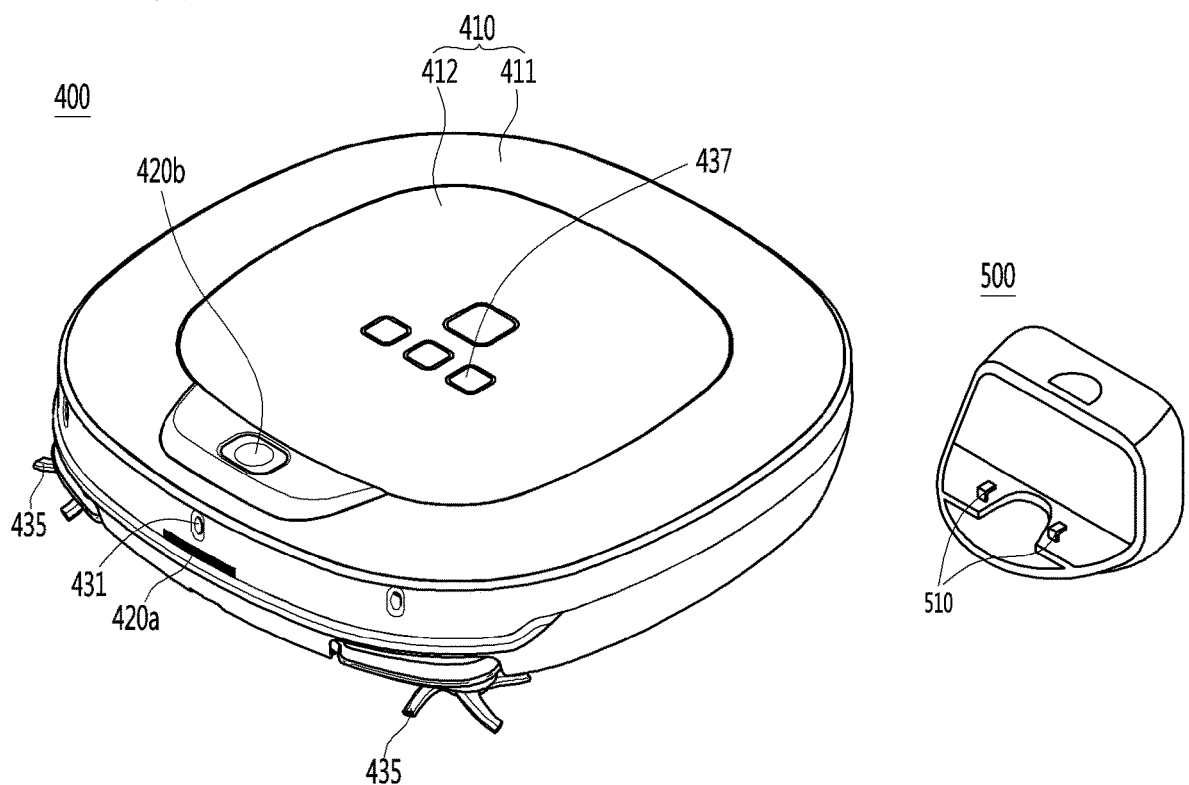
FIG. 5 illustrates perspective views of the moving robot and a charging base for charging the moving robot with power according to an embodiment of the present disclosure.
Figure 6:
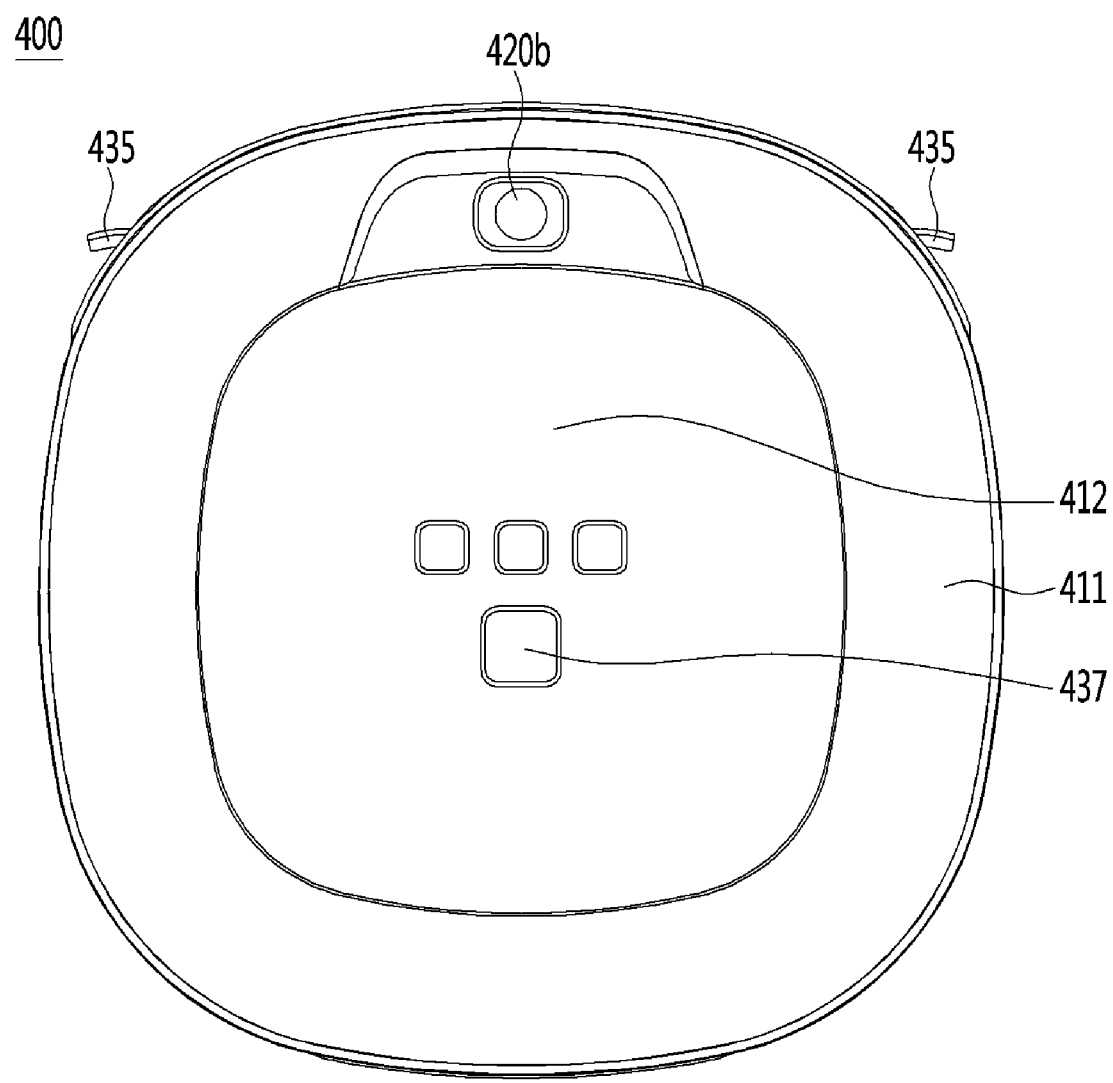
FIG. 6 is a top view illustrating the moving robot of FIG. 5.
Figure 7:
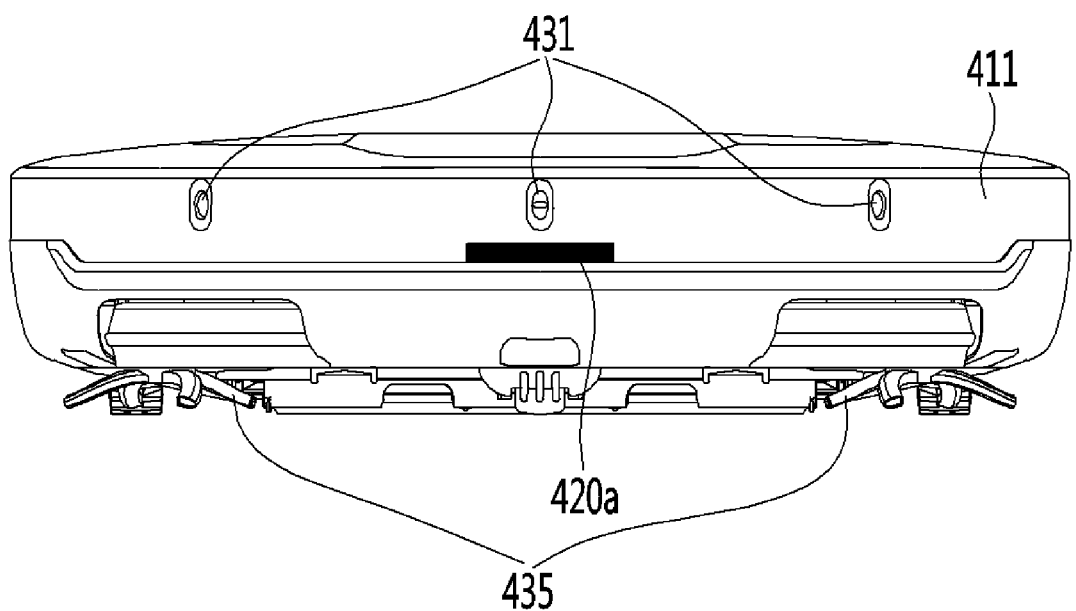
FIG. 7 is a front view illustrating the moving robot of FIG. 5.
Figure 8:
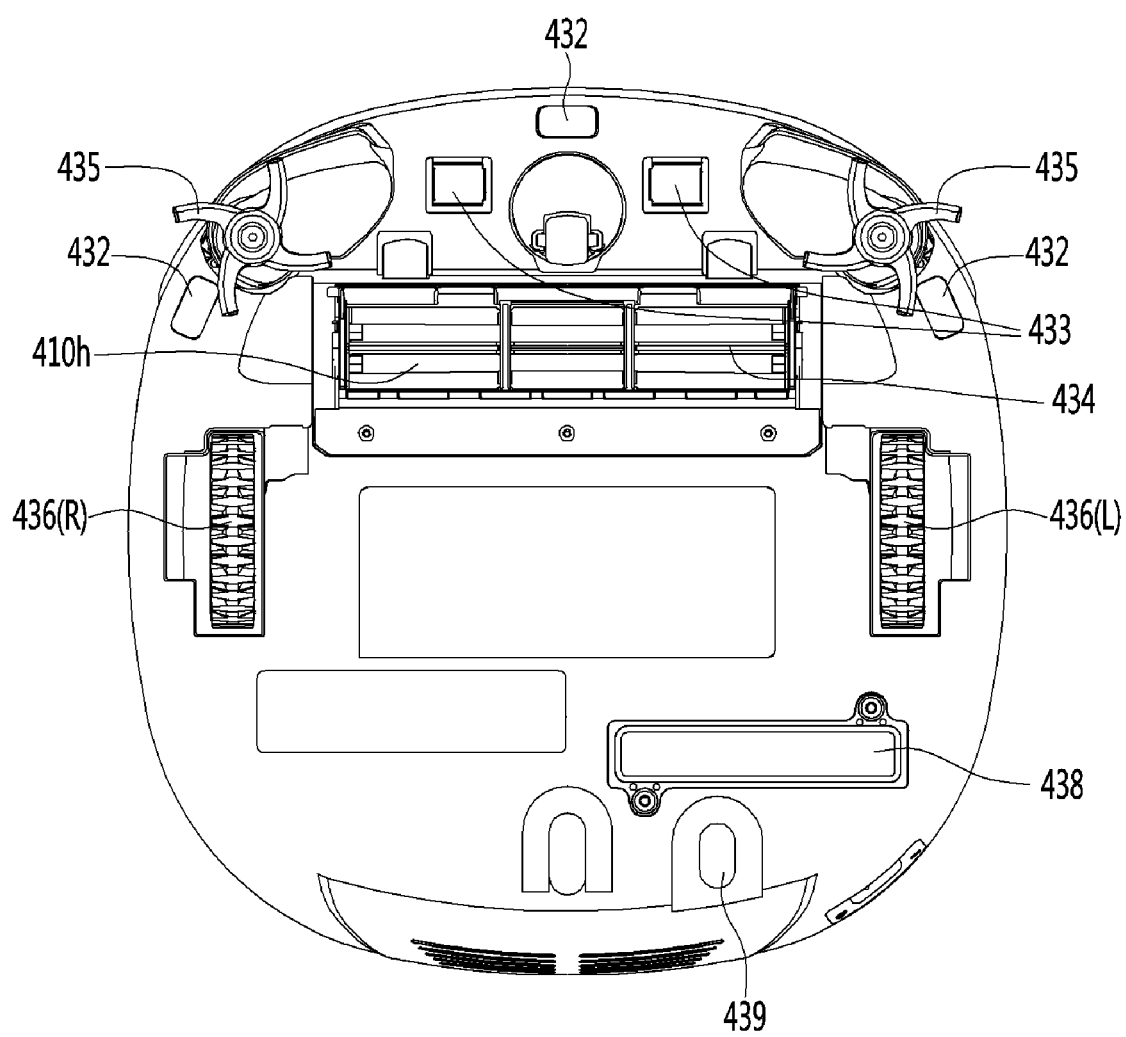
FIG. 8 is a bottom view illustrating the moving robot of FIG. 5.
Figure 9:
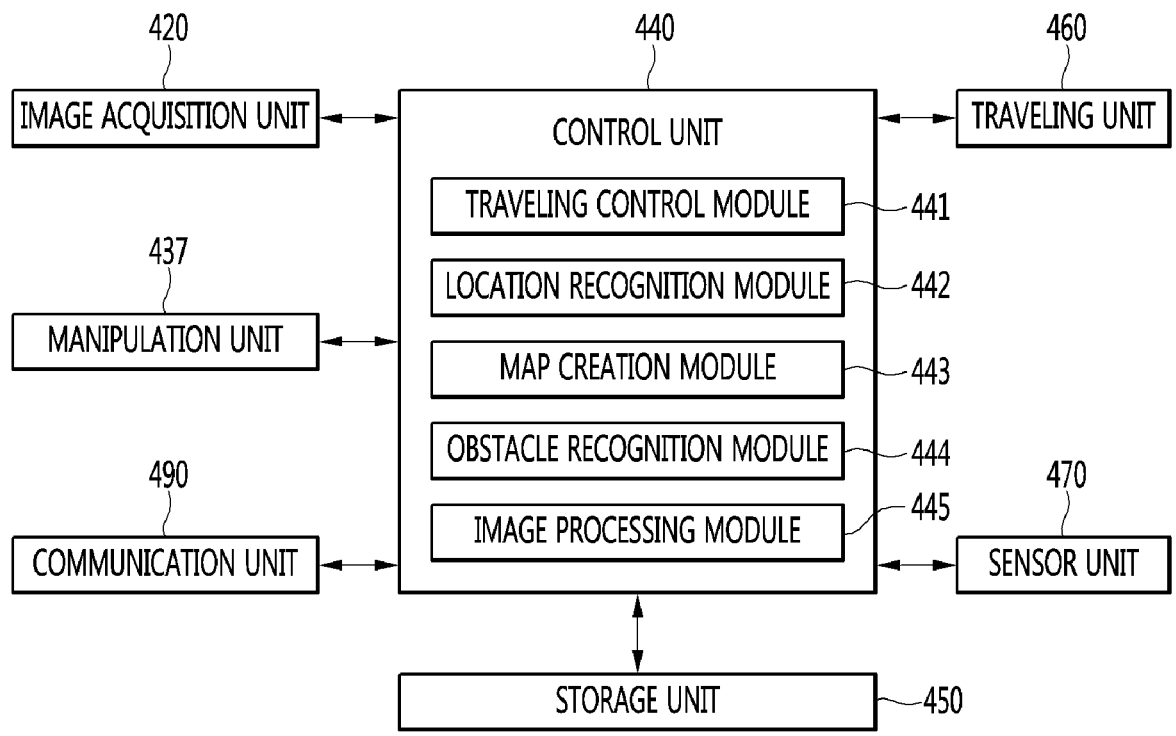
FIGS. 9 and 10 are block diagrams illustrating the relation between main elements of the moving robot according to an embodiment of the present disclosure.
Figure 10:
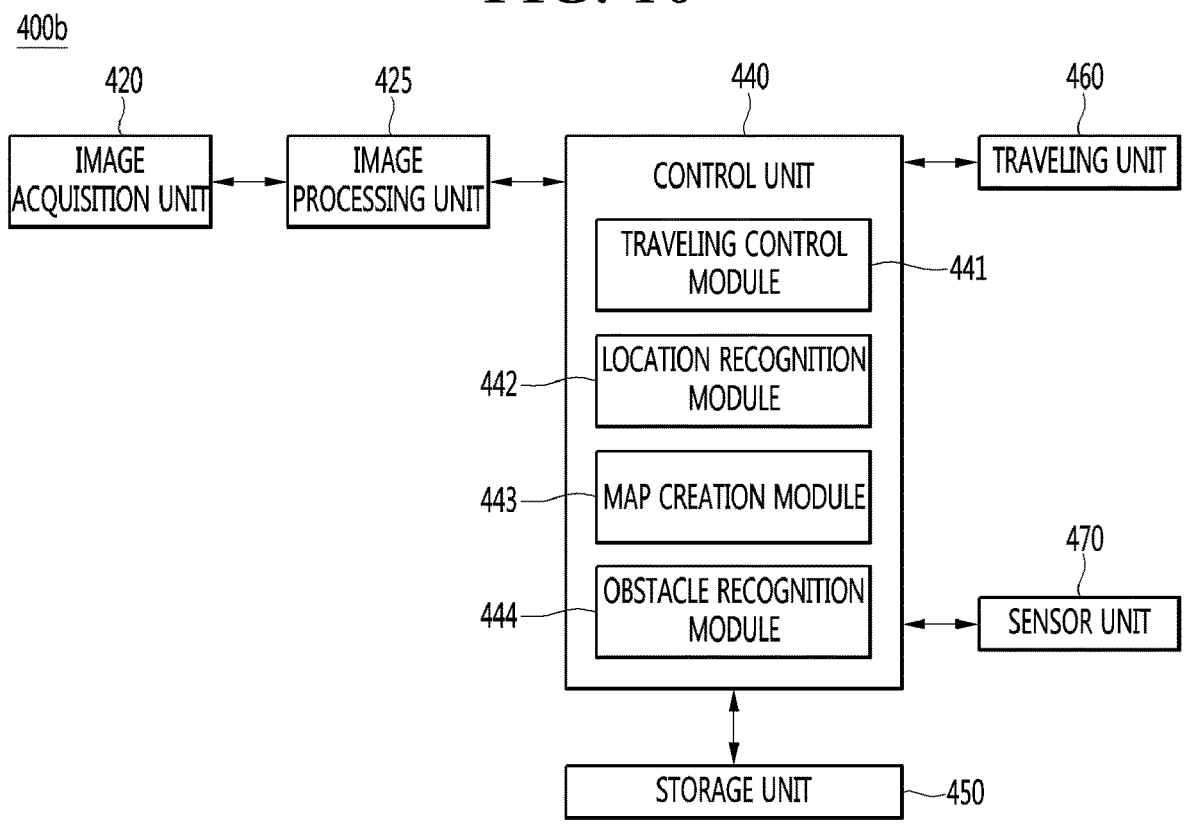

FIG. 5 illustrates perspective views of the moving robot and a charging base for charging the moving robot with power according to an embodiment of the present disclosure. FIG. 6 is a top view illustrating the moving robot of FIG. 5, FIG. 7 is a front view illustrating the moving robot of FIG. 5, and FIG. 8 is a bottom view illustrating the moving robot of FIG. 5. FIGS. 9 and 10 are block diagrams illustrating the relation between main elements of the moving robot according to an embodiment of the present disclosure.

Referring to FIGS. 5 to 10, a moving robot 400, 400*a*, or 400*b* includes a main body 410 and an image acquisition unit (also referred to as an image sensor or a camera) 420 which acquires an image around the main body 410. Hereinafter, in the following definition of parts of the main body 410, a part facing the ceiling in a travelling area of the moving robot is referred to as "top surface part" (see FIG. 6), a part facing the floor in the traveling area is referred to as "bottom surface part" (see FIG. 8), and a part, which faces the traveling direction, of a circumferential part of the main body 410 between the top part and the bottom part is referred to as "front surface part" (see FIG. 7).

The moving robots 400, 400*a*, or 400*b* includes a traveling unit 460 to move the main body 410. The traveling unit 460 includes at least one driving wheel 436 to move the main body 410. The traveling unit 460 includes a driving motor (not illustrated) linked to the driving wheel 436 to rotate the driving wheel 436. The driving wheel 436 includes a left wheel 436(L) and a right wheel 436(R) provided at left and right sides of the main body 410.

Although the left wheel 436(L) and the right wheel 436(R) are driven by one driving motor, left and right wheel driving motors may be provided, if necessary, to drive the left wheel 436(L) and the right wheel 436(R), respectively. The traveling direction of the main body 410 may be switched by making a difference in rotational speed between the left wheel 436(L) and the right wheel 436(R).

A suction port 410*h* may be formed in the bottom surface part of the main body 410 to suck air. In addition, the main body 410 may include a suction device (not illustrated) to provide suction force such that air is sucked through the suction port 410*h*, and a dust container (not illustrated) to collect dust sucked together with the air through the suction port 410*h*.

The main body 410 may include a case 411 having a space to receive various parts constituting the moving robot 400, 400*a*, or 400*b*. The case 411 may have an opening used to insert the dust container in the case 411 or to release the dust container from the case 411. In addition, the case 411 may include a dust container cover 412 pivoted about the case 411.

The main body 410 may include a main brush 434 of a roller type having bristles exposed to the outside through the suction port 410*h* and an auxiliary brush 435 positioned at a front side of the bottom part of the main body 410, having a plurality of blades radially extending, and having bristles. As the brushes 434 and 435 are rotated, dust is separated from the floor in the traveling area, and the dust separated from the floor is sucked through the suction port 410*h* and collected in the dust container.

A battery 438 supplies power necessary for the overall operations of the moving robot 400, 400*a*, or 400*b* as well as the driving motor. When the battery 438 is discharged, the moving robot 400, 400*a*, or 400*b* may return to a charging base 500 to receive power. When the moving robot 400, 400*a*, or 400*b* returns to the charging base 500, the moving robot 400, 400*a*, or 400*b* may autonomously detect the location of the charging base 500.

The charging base 500 may include a signal transmission unit (not illustrated) to transmit a specific return signal, and the return signal may be an ultrasonic signal or an infrared signal, but the present disclosure is not limited thereto. The moving robot 400, 400*a*, or 400*b* may include a signal sensor unit (not illustrated) to receive the return signal. The charging base 500 may include an infrared sensor to transmit the infrared signal through the signal transmission unit and the signal sensing unit may include an infrared sensor to sense the infrared signal. The moving robot 400, 400*a*, or 400*b* moves to the location of the charging base 500 according to the infrared signal transmitted from the charging base 500 for docking on the charging base 500. Through the docking, power charging is performed between a charging terminal 433 of the moving robot 400, 400*a*, or 400*b* and a charging terminal 510 of the charging base 500.

The image acquisition unit (image sensor) 420 captures a travelling area, and may include a camera module. The camera module may include a digital camera. The digital camera may include at least one optical lens, an image sensor (for example, a CMOS image sensor) including a plurality of photodiodes (for example, pixels) to form an image by light passing through the optical lens, and a digital signal processor (DSP) to form the image using signals output from the photodiodes. The DSP may produce a still image and a moving picture including frames formed by the sill image.

Preferably, the image acquisition unit 420 may include a front camera 420a provided to acquire an image of the front of the main body 410 and a top camera 420b provided on the top surface part of the main body 410 to capture an image of the ceiling in the traveling area. However, the location of the image acquisition unit 420 and the capturing range are not limited thereto.

According to the present embodiment, cameras may be installed on some portions (e.g., a front portion, a rear portion, or the bottom) of the moving robot 400, 400a, or 400b and captured images may be continuously acquired in cleaning. Several cameras may be installed on each part of the moving robot 400, 400a, or 400b for the photographing efficiency.

The image captured by the camera may be used to determine the dust or hairs present in the relevant space, to recognize the type of a structure such as the floor, and to determine a cleaning state or a cleaning time point. The front camera 420a may capture the state of an obstacle or an area to be cleaned, which is present in front of the moving robot 400, 400a, or 400b in the traveling direction.

According to an embodiment of the present disclosure, the image acquisition unit 420 may continuously capture the surrounding of the main body 410 to acquire a plurality of images, and the acquired images may be stored in a storage unit 450. The moving robot 400, 400a, or 400b may exactly recognize the obstacle using the plurality of images or using effective data by selecting one or more images of the plurality of images.

The moving robot 400, 400a, or 400b may include the sensor unit 470 including sensors to sense various pieces of data related to the operations and the states of the moving robot 400, 400a, or 400b. For example, the sensor unit 470 may include an obstacle sensor 431 to sense a front obstacle. In addition, the sensor unit 470 may include a cliff detecting sensor 432 to sense whether there is present a cliff on the floor in the traveling area and a lower camera sensor 439 to acquire an image of the floor.

Referring to FIGS. 5 and 7, the obstacle sensor 431 may include a plurality of sensors installed on the circumferential surface of the moving robot 400 at regular distances. For example, the sensor unit 470 may include a first sensor provided on a front surface of the main body 410, and second and third sensors spaced apart leftward and rightward from the first sensor.

The obstacle sensor 431 may include an infrared sensor, an ultrasonic sensor, a radio frequency (RF) sensor, a geomagnetic sensor, or a position sensitive device (PSD) sensor. Meanwhile, the location and the type of the sensor included in the obstacle sensor 431 may be varied depending on the model of the moving robot 400, 400a, or 400b. The obstacle sensor 431 may include various sensors.

The obstacle sensor 431 is a sensor to sense the distance from an interior wall or the obstacle, but the present disclosure is not limited to the type of the obstacle. Hereinafter, an ultrasonic sensor is representatively provided for the illustrative purpose.

The obstacle sensor 431 senses an article, especially, an obstacle present in the traveling (moving) direction of the moving robot and transmits the sensing information to a control unit 440. In other words, the obstacle sensor 431 may sense the moving path of the moving robot, protrusions present on the front or side of the moving robot, and furnishings, furniture, a wall surface, and a wall edge inside a house and transmit the sensing information to the control unit 440.

In this case, the control unit 440 may detect the location of the obstacle based on at least two signals received through the ultrasonic sensor and may control the movement of the moving robot 400 depending on the detected location of the obstacle.

According to an embodiment, the obstacle sensor 431 provided on an outer surface of the case 411 may include a transmission unit and a reception unit. For example, the ultrasonic sensor may include at least one transmission unit and at least two reception unit offset from each other alternately arranged. Accordingly, the ultrasonic sensor may radiate signals at various angles and may receive the signals reflected from the obstacle at various angles. According to the embodiment, the signals received in the obstacle sensor 431 may be subject to signal processing, such as amplifying or filtering, and then the distance and the direction to the obstacle may be calculated.

Meanwhile, the sensor unit 470 may further include a motion sensor to sense the motion of the moving robot 400, 400a, or 400b according to the driving of the main body 410 and to output motion information. The motion sensor may include a gyro sensor, a wheel sensor, or an acceleration sensor.

The gyro sensor senses the rotation direction of the moving robot 400, 400a, or 400b and calculates a rotational angle when the moving robot 400, 400a, or 400b moves depending on driving modes. The gyro sensor detects the angular velocity of the moving robots 400, 400a, or 400b and outputs a voltage value proportional to the angular velocity. The control unit 440 calculates the rotation direction and the rotation angle using the voltage value output from the gyro sensor.

The wheel sensor is linked to the left wheel 436(L) and the right wheel 436(R) to sense the number of revolutions of the wheel. In this case, the wheel sensor may be a rotary encoder. The rotary encoder senses and outputs the number of revolution of the left wheel 436(L) and the number of revolution of the right wheel 436(R). The control unit 440 may calculate rotation speeds of the left wheel 436(L) and the right wheel 436(R) by using the number of revolution of the left wheel 436(L) and the number of revolution of the right wheel 436(R).

The acceleration sensor senses the speed change of the moving robot 400, 400a, or 400b, for example, the change of the moving robot 400, 400a, or 400b, which result from the start, the stop, and the direction change of the moving robot 400, 400a, or 400b, or the collision between the moving robot 400, 400a, or 400b and an object. The acceleration sensor is attached to a position of the moving robot 400, 400a, or 400b adjacent to a main wheel or an auxiliary wheel, thereby detecting the slip or the idle-rotation of the wheel.

In addition, the acceleration sensor may be embedded in the control unit 440 to detect the speed change of the moving robot 400, 400a, or 400b. In other words, the acceleration sensor detects the impact as a function of the speed change to output a voltage value corresponding to the impact. Accordingly, the acceleration sensor may perform the function of an electronic bumper.

The control unit 440 may calculate the location change of the moving robot 400, 400a, or 400b based on the motion information output from the motion sensor. The location may be a relative location corresponding to the absolute location using the image information. The moving robot may improve the performance of location recognition using the image information and the obstacle information.

The moving robot 400, 400a, or 400b may include a power supply unit (not illustrated) having a rechargeable battery 438 to supply power to the moving robot. The power supply unit may supply driving power and operating power to each element of the moving robot 400, 400a, or 400b. If remaining power is insufficient, the power supply unit receives a charging current from the charging base 500 and may be charged with power.

The moving robot 400, 400a, or 400b may further include a battery sensing unit (not illustrated) which senses the charging state of the battery 438 and transmits the sensing result to the control unit 440. The battery 438 is connected with the battery sensing unit to transmit the residual charge amount of the battery and the charging state of the battery to the control unit 440. The residual charge amount may be displayed on a screen of an output unit (not illustrated).

In addition, the moving robot 400, 400a, or 400b includes a manipulation unit (or user interface or buttons) 437 for inputting an On/Off state or various instructions. The moving robot 400, 400a, or 400b may receive various control instructions necessary for the overall operations of the moving robot 400 through the manipulation unit 437. In addition, the moving robot 400, 400a, or 400b may include an output unit (not illustrated) to display reservation information, a battery state, an operating mode, an operating state, or an error state.

Referring to FIGS. 9 and 10, the moving robot 400a or 400b include the control unit (or controller) 440, which recognizes a present location and processes and determines various types of information, and the storage unit 450 which stores various types of data. In addition, the moving robot 400, 400a, or 400b may further include a communication unit (or communication interface) 490 which transmits/receives data together with an external terminal.

The external terminal may include an application for controlling the moving robot 400a or 400b, and may display a map of a traveling area to be cleaned by the moving robot 400a or 400b, and specify an area to be cleaned on the map, by executing an application. The external terminal may include, for example, a remote control, a personal digital assistant, a laptop, a smartphone, a tablet, or the like having an application installed for map settings.

The external terminal may communicate with the moving robot 400a or 400b to display a present location of the moving robot 400a or 400b together with the map and to display information on a plurality of areas. In addition, the external terminal updates and displays the location of the moving robot as the moving robot travels.

The control unit 440 controls the image acquisition unit 420, the manipulation unit 437, and the traveling unit 460 to control the overall operation of the moving robot 400.

The storage unit 450, which records various types of information necessary for the control of the moving robot 400, may include a volatile recording medium or a non-volatile recording medium. The recording medium, which stores data readable by a micro-processor, may include a hard disk drive (HDD), a solid state disk (SSD), a silicon disk drive (SDD), a read only memory (ROM), a read access memory, a CD-ROM, a magnetic tape, a floppy disk, an optical data storage device, or the like.

In addition, the storage unit 450 may store the map of the traveling area. The map may be input by an external terminal or a server which is able to exchange information through wired communication or wireless communication or may be created by autonomous learning of the moving robot 400a or 400b.

The map may represent the positions of chambers in the traveling area. In addition, the present location of the moving robot 400a or 400b may be represented on the map. The present location of the moving robot 400a or 400b may be updated in a traveling procedure. The external terminal stores a map the same as that stored in the storage unit 450.

The storage unit 450 may store information on a cleaning history. The information on the cleaning history may be created when cleaning is performed. The map of the traveling area stored in the storage unit 450 may be a navigation map used for traveling during cleaning, a simultaneous localization and mapping (SLAM) map used for location recognition, a learning map used in cleaning by storing information on collision with an obstacle if the moving robot 400a or 400b collides with the obstacle, a location map of the whole area, which is used to recognize the positions of the whole area, or an obstacle recognition map having information on the recognized obstacle.

Meanwhile, as described above, maps may be classified according to usages and may be stored and managed in the storage unit 450. The maps may not be exactly classified according to usages. For example, a plurality of pieces of information may be stored with respect to one map such that the map is used for at least two usages.

The control unit 440 may include a traveling control module (or travel control processor) 441, a location recognition module (or location recognition processor) 442, a map creation module (or map creation processor) 443, and an obstacle recognition module (or obstacle recognition processor) 444. Referring to FIGS. 6 to 10, the traveling control module 441 controls the traveling of the moving robot 400, 400a, or 400b. The traveling control module 441 controls the driving of the traveling unit 460 according to traveling settings. In addition, the traveling control module 441 may detect the traveling path of the moving robot 400, 400a, or 400b based on the operation of the traveling unit 460. For example, the traveling control module 441 may detect a present or past moving speed or travelling distance of the moving robot 400, based on the rotation speed of the driving wheel 436. The traveling control module 441 may detect a present or past direction switching procedure according to a rotation direction of each driving wheel 436L or 436R. The positions of the moving robot 400, 400a, or 400b may be updated on the map, based on the detected traveling information of the moving robot 400, 400a, or 400b.

The map creation module 443 may create the map of the traveling area. The map creation module 443 may process an image acquired through the image acquisition unit 420 and may create the map. The map creation module 443 may create a cleaning map corresponding to the cleaning area. The map creation module 443 processes an image acquired through the image acquisition unit 420 at each position, links the map to the image, and may recognize the positions of the whole areas.

The location recognition module 442 estimates and recognizes a present location. The location recognition module 442 detects the location through the link to the map creation module 443 by using image information of the image acquisition unit 420. Accordingly, even if the positions of the moving robot 400, 400a, or 400b are rapidly changed, the location recognition module 442 estimates and recognizes the present location.

The moving robot 400, 400a, or 400b may recognize locations through the location recognition module 442 while continuously traveling. In addition, the moving robot 400, 400a, or 400b may learn the map and may estimate the present location through the map creation module 443 and the obstacle recognition module 444 without employing the location recognition module 442.

While the moving robot 400, 400a, or 400b are travelling, the image acquisition unit 420 acquires images of surroundings of the moving robot 400. Hereinafter, the image acquired by the image acquisition unit 420 may be referred to "acquired image". The acquired image includes several features, such as lightings positioned on the ceiling, an edge, a corner, a blob, and a ridge.

The map creation module 443 detects the feature from each acquired image. Various feature detection methods for detecting features from the image are well known in computer vision technical fields. In addition, various feature detectors suitable for the detecting of the features are well known. For example, the feature detectors include Canny, Sobel, Harris & Stephens/Plessey, SUSAN, Shi & Tomasi, Level curve curvature, FAST, Laplacian of Gaussian, Difference of Gaussians, Determinant of Hessian, MSER, PCBR, and Grey-level blobs detectors. The map creation module 443 calculates a descriptor based on each feature point.

The map creation module 443 may transform the feature point into the descriptor using a Scale Invariant Feature Transform (SIFT) scheme to detect the feature point. The descriptor may be expressed in an N-dimensional vector. The SIFT scheme can detect invariant features with respect to scale, rotation, and brightness change of a target to be captured. Accordingly, even if the same area is captured by varying the posture of the moving robot 400, the invariant (that is, rotation-invariant) features may be detected. However, the present disclosure is not limited thereto, but various schemes (for example, Histogram of Oriented Gradient (HOG), Haar feature, Local Binary Pattern (LBP), or Modified Census Transform (MCT)) may be employed.

The map creation module 443 may classify at least one descriptor for each acquired image into a plurality of groups according to a specific lower classification rule, based on descriptor information obtained through the acquired image of each location. Then, descriptors belonging to the same group may be transformed into lower representative descriptors, respectively, according to a specific lower representative rule.

For another example, all collected descriptors for the acquired images of specific sections such as rooms may be classified into a plurality of groups according to the specific lower classification rule. Then, descriptors belonging to the same group may be transformed into lower representative descriptors, respectively, according to a specific lower representative rule.

The map creation module 443 may detect the feature distribution for each location through the above procedure. The feature distribution for each location may be expressed in histogram or an N-dimensional vector. For another example, the map creation module 443 may estimate an unknown present location based on a descriptor calculated from each feature point without employing the specific lower level classification rule and the specific lower representative rule. In addition, when the present location of the moving robot 400, 400a, or 400b become unknown due to the location leap, the present location may be estimated based on data of a previously-stored descriptor or a lower representative descriptor.

The moving robot 400, 400a, or 400b acquires an image acquired through the image acquisition unit 420 at an unknown position. The image helps to identify several features, such as lightings positioned on the ceiling, an edge, a corner, a blob, and a ridge. The location recognition module 442 detects the features from the acquired image. The description has been made regarding various methods of detecting the features from the image and several feature detectors suitable for the detection of the features in the computer vision technical fields.

The location recognition module 442 calculates a recognition descriptor through the step of calculating the recognition descriptor based on each recognition feature point. In this case, the recognition feature point and the recognition descriptor are to describe the procedure performed in the obstacle recognition module 444 and are used to distinguish from the terms of describing the procedure performed in the map creation module 443. However, the recognition feature point and the recognition descriptor are made only by defining features outside the moving robot 400, 400a, or 400b with mutually different terms.

The location recognition module 442 may transform the recognition feature points into the recognition descriptor through a scale invariant feature transform (SIFT) scheme for detecting the present features. The recognition descriptor may be expressed in an N-dimensional vector.

As described above, the SIFT is an image recognition scheme. According to SIFT, after selecting a feature point such as a corner point, which is easily identified from the acquired image, an N-dimensional vector is obtained by transforming the rapid degree of change in each direction with respect to the brightness gradient distribution characteristic (the direction of brightness change and the rapid degree of the change) of pixels belonging to a specific section around each feature point.

The location recognition module 442 transforms location information (for example, the feature distribution of each location) to be compared into comparable information (lower recognition feature distribution) according to a specific lower transform rule, based on at least one recognition descriptor information obtained through an acquired image of an unknown present location.

According to a specific lower comparison rule, feature distribution of each location is compared with relevant recognition feature distribution to calculate similarity. The similarity (probability) for each location may be calculated and a location having the highest probability may be determined as a present location.

As described above, the control unit 440 may identify a traveling area, may create a map of a plurality of areas, or may recognize a present location of the main body 410 based on the previously-stored map. If the map is created, the control unit 440 may transmit the created map to an external terminal or server through the communication unit 490. In addition, if a map is received from the external terminal or the server, the control unit 440 may store the map.

In addition, if the map is updated during the traveling, the control unit 440 transmits the updated information to the external terminal such that the map of the external terminal is identical to the map stored in the moving robot 400, 400a, or 400b. As the map stored in the moving robot 400, 400a, or 400b is maintained identically to the map of the external terminal, the moving robot 400, 400a, or 400b may clean a specific area according to a cleaning instruction from the mobile terminal, and the present location of the moving robot may be displayed on the external terminal.

In this case, the map may be divided into a plurality of areas, may include passages for connecting the areas with each other, and may include information on obstacles in the areas. If the cleaning instruction is input, the control unit 440 determines whether the location on the map is matched with the present location of the moving robot 400, 400a, or 400b. The cleaning instruction may be input from a remote controller, a manipulation unit, or the external terminal.

If the location on the map is not matched with the present location of the moving robot 400, 400a, or 400b or a present location is not identified, the control unit 440 may recognize a new present location, may restore the present location of the moving robot 400, 400a, or 400b as the new present location, and may control the traveling unit 460 to move the moving robot 400, 400a, or 400b to a specific area based on the recognized present location.

If the location on the map is not matched with the present location of the moving robot 400, 400a, or 400b or a present location is not identified, the location recognition module 442 may estimate the present location based on the map by analyzing the acquired image input from the image acquisition unit 420. In addition, the obstacle recognition module 444 or the map creation module 443 may recognize the present location in the same manner.

After the present location of the moving robot 400, 400a, or 400b is restored through location recognition, the traveling control module 441 calculates a traveling path to a specific area from the present location and controls the traveling unit 460 to move the moving robot 400, 400a, or 400b to the specific area.

When receiving cleaning pattern information from the server, the traveling control module 441 may divide the whole traveling area into a plurality of areas based on the received cleaning pattern information and may set at least one area to the specific area. In addition, the traveling control module 441 may calculate the traveling path based on the received cleaning pattern information and may control the moving robot 400, 400a, or 400b to travel along the traveling path while cleaning up.

If the specific area, which is set, is completely cleaned up, the control unit 440 may store a cleaning history in the storage unit 450. In addition, the control unit 440 may transmit the operation state of the moving robot 400, 400a, or 400b or the cleaning state to the external terminal or the server through the communication unit 490. Accordingly, the external terminal displays the location of the moving robot 400, 400a, or 400b together with the map on the screen of the application under execution and output the information on a cleaning state, based on the received data.

If the moving robot 400, 400a, or 400b moves according to an embodiment of the present disclosure moves until an obstacle or a wall surface is detected in one direction, and then recognizes the obstacle, the moving robot 400, 400a, or 400b determines a traveling pattern, such as straight movement or rotation.

For example, if the recognized obstacle is an obstacle over which the moving robot 400, 400a, or 400b crosses, the moving robot 400, 400a, or 400b may keep straightly moving. Alternatively, if the recognized obstacle is an obstacle over which the moving robot 400, 400a, or 400b does not cross, the moving robot 400, 400a, or 400b rotates, moves by a specific distance, moves in a direction opposite to a first movement direction to the distance that the obstacle is detected, and travels in a zig-zag pattern.

The moving robot 400, 400a, or 400b according to an embodiment of the present disclosure may perform obstacle recognition and avoidance based on machine learning. The control unit 440 may include the obstacle recognition module 444, which recognizes an obstacle, which is previously learned, from an input image through machine learning, and the traveling control module 441 which controls the driving of the traveling unit 460 based on the attributes of the recognized obstacle.

The moving robot 400, 400a, or 400b according to an embodiment of the present disclosure may include the obstacle recognition module 444 having the attributes of the obstacle which are learned through machine learning. The machine learning is a scheme in which a computer learns data without directly instructing logic by a person and thus solves a problem.

Deep learning is an artificial intelligence (AI) technology of teaching the thinking manner of the person to the computer based on artificial neural network (ANN) constituting AI. According to the deep learning, even if a person does not teach a computer, the computer may autonomously learn like a person. The ANN may be realized in the form of software or hardware such as a chip.

The obstacle recognition module 444 may include an ANN provided in the form of software or hardware having the learned attributes of the obstacle. For example, the obstacle recognition module 444 may include a Deep Neural Network (DNN) such as a Convolutional Neural Network (CNN), a Recurrent Neural Network (RNN), or a Deep Belief Network (DBN), learned through the deep learning.

The deep learning will be described later with reference to FIGS. 12 to 14. The obstacle recognition module 444 may determine the attribute of the obstacle included in input image data based on weights between nodes included in the DNN.

Meanwhile, if the sensor unit 470 senses the obstacle while the moving robot 400, 400a, or 400b is moving, the control unit 440 may perform a control operation to extract a partial area of an image which is acquired by the image acquisition unit 420 corresponding to the direction of the obstacle.

The image acquisition unit 420, especially, the front camera 420a may acquire an image within a specific angle range in the moving direction of the moving robot 400, 400a, or 400b. The control unit 440 may determine the attributes of the obstacle present in the moving direction of the moving robot 400, 400a, or 400b using a partial area of the image acquired by the image acquisition unit 420 instead of the entire area of the image.

Referring to an embodiment described with reference to FIG. 9, the control unit 440 may further include an image processing module 445 which extracts a partial area of the image acquired by the image acquisition unit 420 corresponding to the direction of the obstacle sensed by the sensor unit 470.

Referring to an embodiment described with reference to FIG. 10, the moving robot 100b may further include an image processing unit 425 which extracts a partial area of the image acquired by the image acquisition unit 420 corresponding to the direction of the obstacle sensed by the sensor unit 470.

The moving robot 400a illustrated in FIG. 9 has the same elements as those of the moving robot 400b illustrated in FIG. 10 except for the image processing module 455 and the image processing unit 425. In addition, according to an embodiment, the image acquisition unit 420 may directly extract the partial area of the image, which is different from the embodiments of FIG. 9 and FIG. 10.

The obstacle recognition module 444 learned through the machine learning represents a higher recognition ratio as a target to be learned more occupies a part of the input image data due to the characteristic of the obstacle recognition module 444. Therefore, according to the present disclosure, another area is extracted from the image acquired by the image acquisition unit 420 in the direction of the obstacle sensed by the sensor unit 470 such as an ultrasonic sensor and used as data for recognition, so the recognition ratio is increased.

The obstacle recognition module 444 may recognize the obstacle from the extracted image, based on the previously-learned data, through the machine learning. The traveling control module 441 may control the driving of the traveling unit 460 based on the attributes of the recognized obstacle.

Meanwhile, the control unit 440 may perform a control operation to extract a lower right area of an image acquired by the image acquisition unit, if the obstacle is detected rightward from the front surface of the main body, to extract a lower left area of the image acquired by the image acquisition unit, if the obstacle is detected leftward from the front surface of the main body, and to extract a lower central area of the image acquired by the image acquisition unit if the obstacle is detected in front of the main body.

In this case, the control unit 440 may perform a control operation to extract a target area of the image the image acquired by the image acquisition unit by shifting the target area corresponding to the direction of the detected obstacle. If the sensor unit 470 senses the obstacle while the moving robot 400, 400a, or 400b is moving, the control unit 440 may perform a control operation to select an image, which is acquired at a specific time point before the obstacle is detected, among a plurality of images, which are consecutively acquired by the image acquisition unit 420, based on the moving direction and the moving speed of the main body 410.

When the image acquisition unit 420 is triggered at the time point, at which the sensor unit 470 senses the obstacle, to acquire an image, the moving robot 400, 400a, or 400b continuously moves. Accordingly, the obstacle is not or less included in the acquired image.

Therefore, according to an embodiment of the present disclosure, the image acquisition unit 420 may select the image, which is acquired at a specific time point before the obstacle is detected, among the images, which are consecutively acquired by the image acquisition unit 420, based on the moving direction and the moving speed of the main body 410, and may use the image as data for the obstacle recognition. Meanwhile, the obstacle recognition module 444 may recognize the attributes of the obstacle included in the selected image at the specific time point, based on data previously learned through the machine learning.

Meanwhile, the storage unit 450 may store data for determining the attributes of the obstacle and data for learn the DNN. The storage unit 450 may store an original image acquired by the image acquisition unit 420 and extracted images for a specific area. In addition, according to an embodiment, the storage unit 450 may store weights and biases constituting the structure of the DNN. Alternatively, according to an embodiment, the weights and the biases constituting the structure of the DNN may be stored in a memory embedded in the obstacle recognition module 444.

Meanwhile, the obstacle recognition module 444 may perform a learning process using a partial area of the image, which is acquired by the image acquisition unit 420, as training data whenever extracting the partial area, or may perform the learning process after acquiring the specific number of extracted images.

In other words, the obstacle recognition module 444 may update the structure of the DNN including a weight by adding a recognition result whenever recognizing the obstacle, or may update the structure of the DNN including the weight by performing the learning process using training data which has been ensured by the specific number of frequencies or more. That is, the obstacle recognition module may determine a final recognition result as the final attribute of the obstacle when obstacle recognition is completed with respect to the obstacle area.

In addition, the obstacle recognition module may register, into the map, the obstacle, as a dangerous obstacle or a non-dangerous obstacle according to the determined final attribute of the obstacle. For example, the dangerous obstacle may include the obstacle has the height over which the moving robot cannot goes. Also, the non-dangerous obstacle may include the obstacle has the height over which the moving robot goes.

Alternatively, the moving robot 400, 400a, or 400b may transmit the extracted image to the server through the communication unit 490 and may receive data related to the machine learning from a specific server. In this case, the moving robot 400, 400a, or 400b may update the obstacle recognition module 444 based on the data related to the machine learning, which is received from the specific server.

Figure 11:
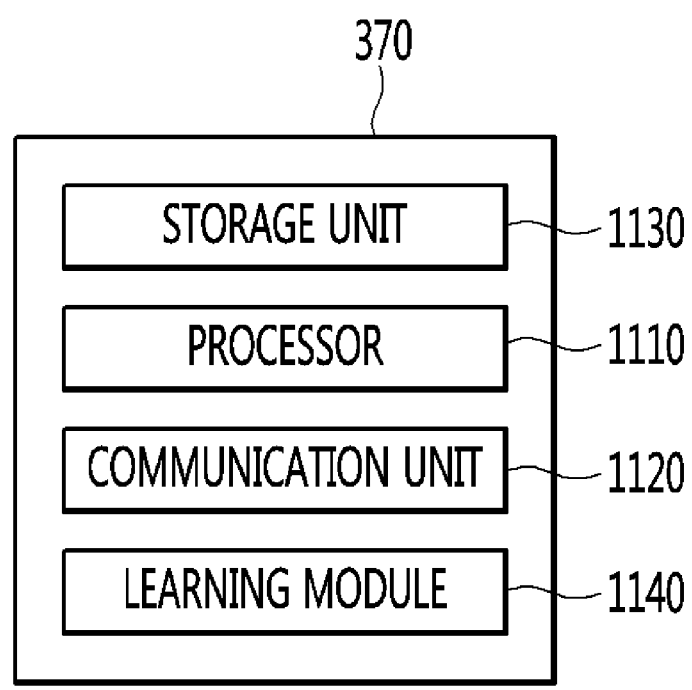
FIG. 11 is a block diagram illustrating the detailed internal structure of a server according to an embodiment of the present disclosure.

FIG. 11 is a block diagram illustrating the brief internal structure of a server according to an embodiment of the present disclosure. Referring to FIG. 11, a server 370 may include a communication unit 1120, a storage unit 1130, a learning module 1140, and a processor 1110.

The processor 1110 may control the overall operation of the server 370. The server 370 may be a server operated by a manufacturer of a home appliance, such as the moving robot 400, 400a, or 400b, or a server operated by a service provider. The server 370 may be a kind of a cloud server.

The communication unit 1120 may receive various types of data, such as state information, operation information, or manipulation information, from the home appliance such as a mobile terminal, or a moving robot 400, 400a, or 400b, or a gateway. The communication unit 1120 may transmit data corresponding to the received various types of information to the home appliance such as the mobile terminal or the moving robot 400, 400a, or 400b, or a gateway. To this end, the communication unit 1120 may include one or more communication modules such as an Internet module and a mobile communication module.

The storage unit 1130 may store the received information and may include data for generating result information corresponding to the received information. The storage unit 1130 may store data used for machine learning or result data.

The learning module 1140 may serve as a learning appliance for the home appliance such as the moving robots 400, 400a, or 400b. The learning module 1140 may include an ANN, for example, a CNN, an RNN, a DBN (Deep Belief Network), or a DNN, and may learn a deep neural network. The learning module 1140 may use both unsupervised learning and supervised learning as a learning manner.

Meanwhile, the processor 1110 may perform a control operation to update the structure of the ANN of the home appliance, such as the moving robots 400, 400a, or 400b, to the learned of the artificial neural network after learning according to the settings.

FIGS. 12 to 15 are views referred to in explanation of Deep Learning. Deep Learning, which is a kind of Machine Learning, is a learning process performed to a deeper level in multiple levels, based on data. Deep Learning may represent a set of machine learning algorithms that extract key data from a plurality of data as the level is increased.

A Deep Learning structure may include an ANN. For example, the Deep Learning structure may include a DNN such as a CNN, an RNN, or a DBN. Referring to FIG. 12, the ANN may include an input layer, a hidden layer, and an output layer. Each layer includes a plurality of nodes, and each layer is linked to the next layer. The nodes between adjacent layers may be linked to each other with a weight.

Figure 13:
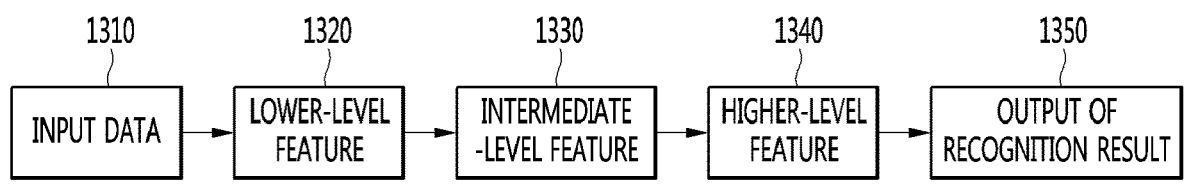

Referring to FIG. 13, a computer (machine) finds out a specific pattern from input data 1310, which is input to the computer, to form a feature map. The computer (machine) may extract from a lower-level feature 1320 to a higher-level feature 1340 through an intermediate-level feature 1330, may recognize a target, and may output a recognition result 1350. In the ANN, the higher-level feature may be abstracted as layers proceed to the next layer.

Figure 12:
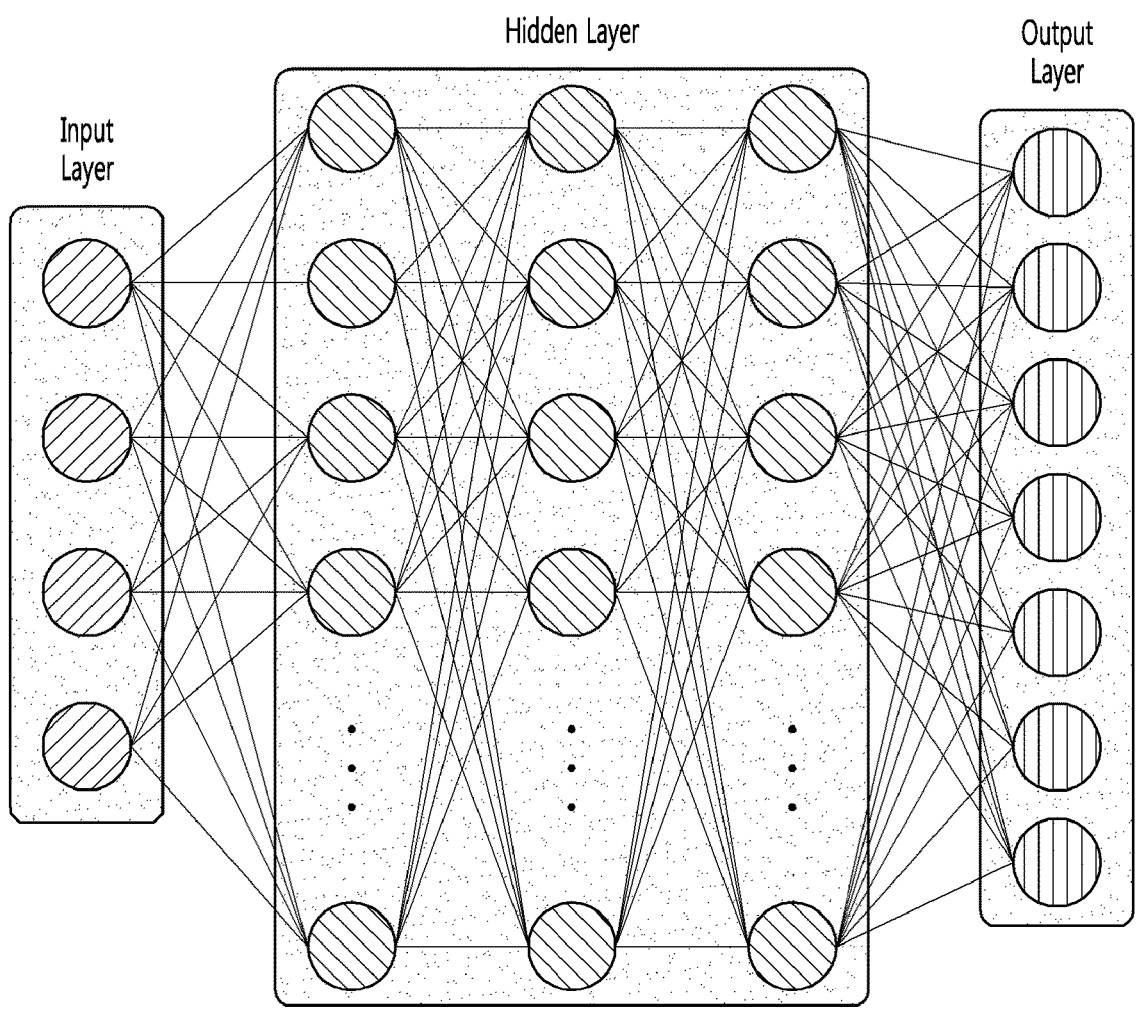

Referring to FIGS. 12 and 13, each node may operate based on an activation model, and may determine an output value corresponding to an input value based on the activation model. The output value of a specific node, for example, the lower-level feature 1320, may be input to a node (for example, a node having the intermediate-level feature 1330) at the next layer linked to the specific node. The node (for example, a node having the intermediate-level feature 1330) at the next layer, may receive values output from a plurality of nodes having the lower-level feature 1320.

In this case, the input value of each node may be a value to which a weight is applied to an output value from a node at a previous layer. The weight may refer to link strength between nodes. In addition, the deep running process may be regarded as a process of finding out an appropriate weight.

Meanwhile, the output value of a specific node, for example, a node having the intermediate-level feature 1330, may be input to a node (for example, a node having the higher-level feature 1340) at the next layer linked to the specific node. The node (for example, a node having the higher-level feature 1340) at the next layer may receive values output from a plurality of nodes having the intermediate-level feature 1330.

In the ANN, feature information corresponding to each level may be extracted using a learned layer corresponding to each level. In the ANN, abstraction may be sequentially performed, and thus a specific target may be recognized using the feature information of the highest level.

For example, regarding a face recognition process through Deep Learning, a computer distinguishes between brighter pixel and darker pixel of an input image based on pixel brightness, may identify a simple shape such as a border or an edge, and may identify a more complex shape and an object. Finally, the computer detects the shape of defining the face of a human being.

The deep running structure according to the present disclosure may use various structures which are generally known in the art to which the present disclosure pertains. For example, the deep learning structure according to the present disclosure may be a CNN, an RNN, or a DBN.

The RNN has been extensively used in natural language processing and is structured to effectively process time-series data that varies with time. According to the RNN, layers are stacked every moment to construct the ANN.

The DBN is a deep running structure constructed by stacking RBMs, which belong to a deep running technique at multiple layers. If the specific number of layers is formed by repeating the RBM, a DBN having the relevant number of layers may be constructed.

The CNN, which is a structure extensively used in the field of object recognition, will be described with reference to FIG. 14. The CNN is a model formed by simulating the brain function of a human being on the assumption that the human being extracts basic features of an object, performs a complex computing procedure in the brain, and recognizes the object based on the computing result when recognizing the object.

Figure 14:
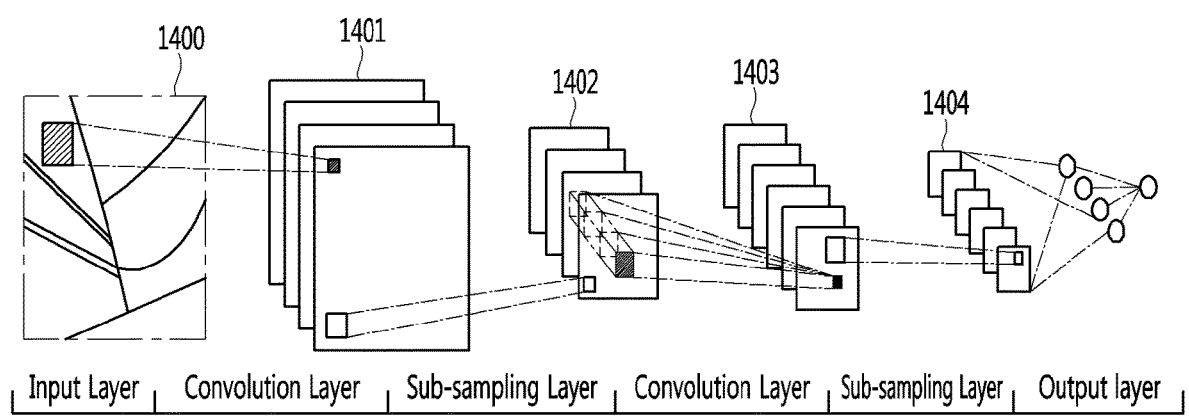

FIG. 14 is a view illustrating the CNN structure. The CNN may include an input layer, a hidden layer, and an output layer. A specific image 1400 is input to the input layer. Referring to FIG. 14, the hidden layer may include a plurality of layers including a convolution layer and a sub-sampling layer.

In the CNN (Convolutional Neural Network), a variety of filters for extracting features of an image through convolution operations and a pooling or nonlinear activation function for adding nonlinear characteristics, etc. are used together. Convolution is mainly used in a filter computation in the field of the image processing and is used to realize a filter for extracting features from an image.

For example, as illustrated in FIG. 15, if the convolution operation is repeatedly performed on the whole image while moving the 3×3 window, a proper result may be obtained according to weight values of the window. Referring to (a) of FIG. 15, when the convolution operation is performed on a specific area 1510 of the whole image using the 3×3 window, a result value 1501 is obtained. Referring to (b) of FIG. 15, if a result is found out with respect to an area 1520 obtained by shifting the 3×3 window by 1 rightward, a specific result value 1502 may be found out. In other words, as illustrated in (c) of FIG. 15, if the convolution operation is performed with respect to the entire area of the image while shifting a specific window, the final result may be found out.

The convolution layer may be used to perform convolution filtering to filter information extracted from a previous layer using a filter having a specific size (for example the 3×3 window illustrated in FIG. 15). The convolution layer may perform the convolution operation with respect to the data of the input images 1400 and 1402 using a convolution filter and may create feature maps 1401 and 1403 representing the features of the input image 1400.

As a result obtained through the convolution filtering, filtering images may be created by the number of filters included in the convolution layer. The convolution layer may include nodes included in the filtering images.

The sub-sampling layer paired with the convolution layer may include feature maps formed in number equal to the number of the feature maps of the paired convolution layer. The sub-sampling layer may reduce the dimensions of feature maps 1401 and 1403 through sampling or pooling. The output layer recognizes the input image 1400 by combining various features expressed in the feature map 1404.

The obstacle recognition module of the moving robot according to the present disclosure may employ various deep learning structures described above. For example, the obstacle recognition module may employ a CNN structure which has been extensively used in object recognition of an image, but the present disclosure is not limited thereto.

Meanwhile, the ANN learning may be performed by adjusting a weight applied to a link line between nodes such that a desired output is obtained from a given input. In addition, the ANN may continuously update a weight value through learning. Further, in the ANN learning, a technique such as Back Propagation may be employed.

Figure 16:
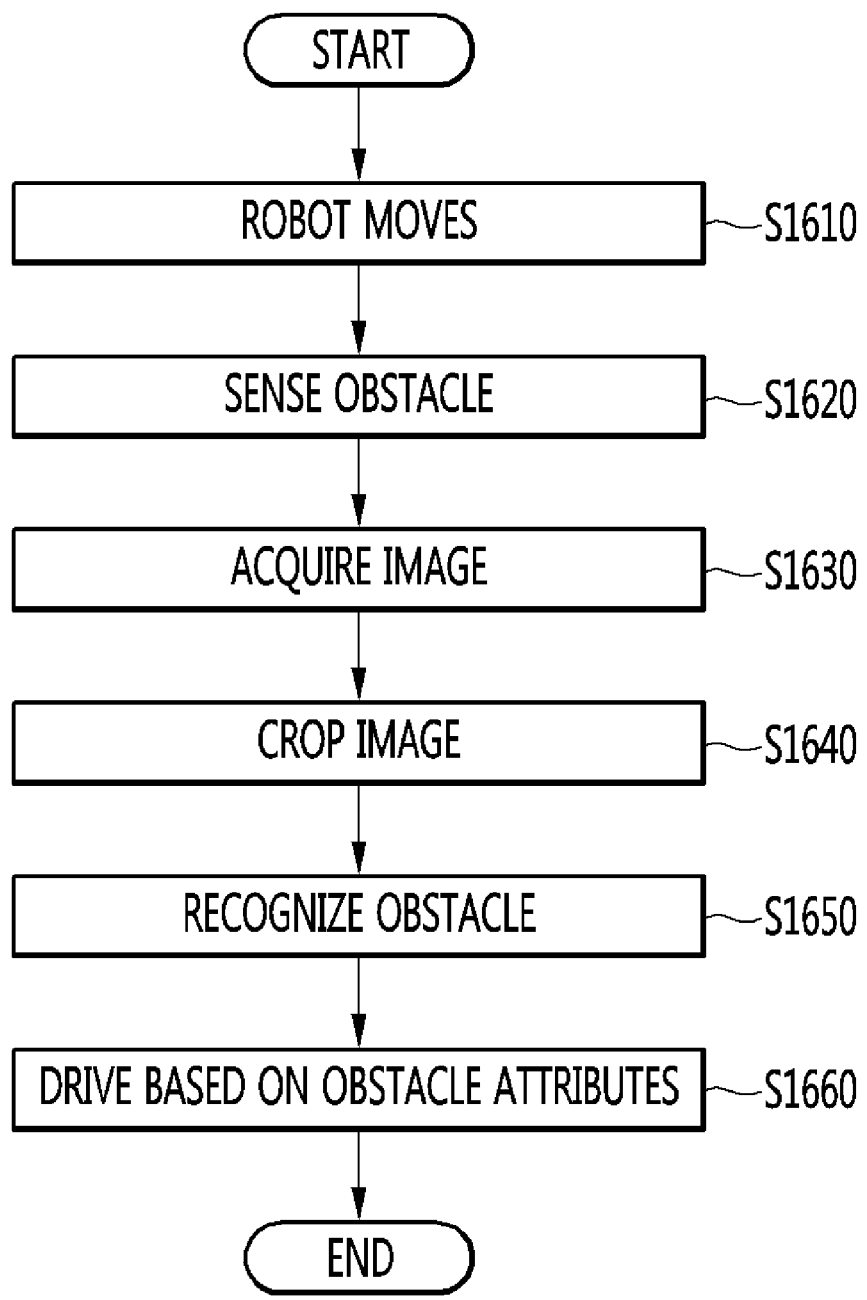
FIG. 16 is a flowchart illustrating a control method of the moving robot according to an embodiment of the present disclosure.
Figure 17:
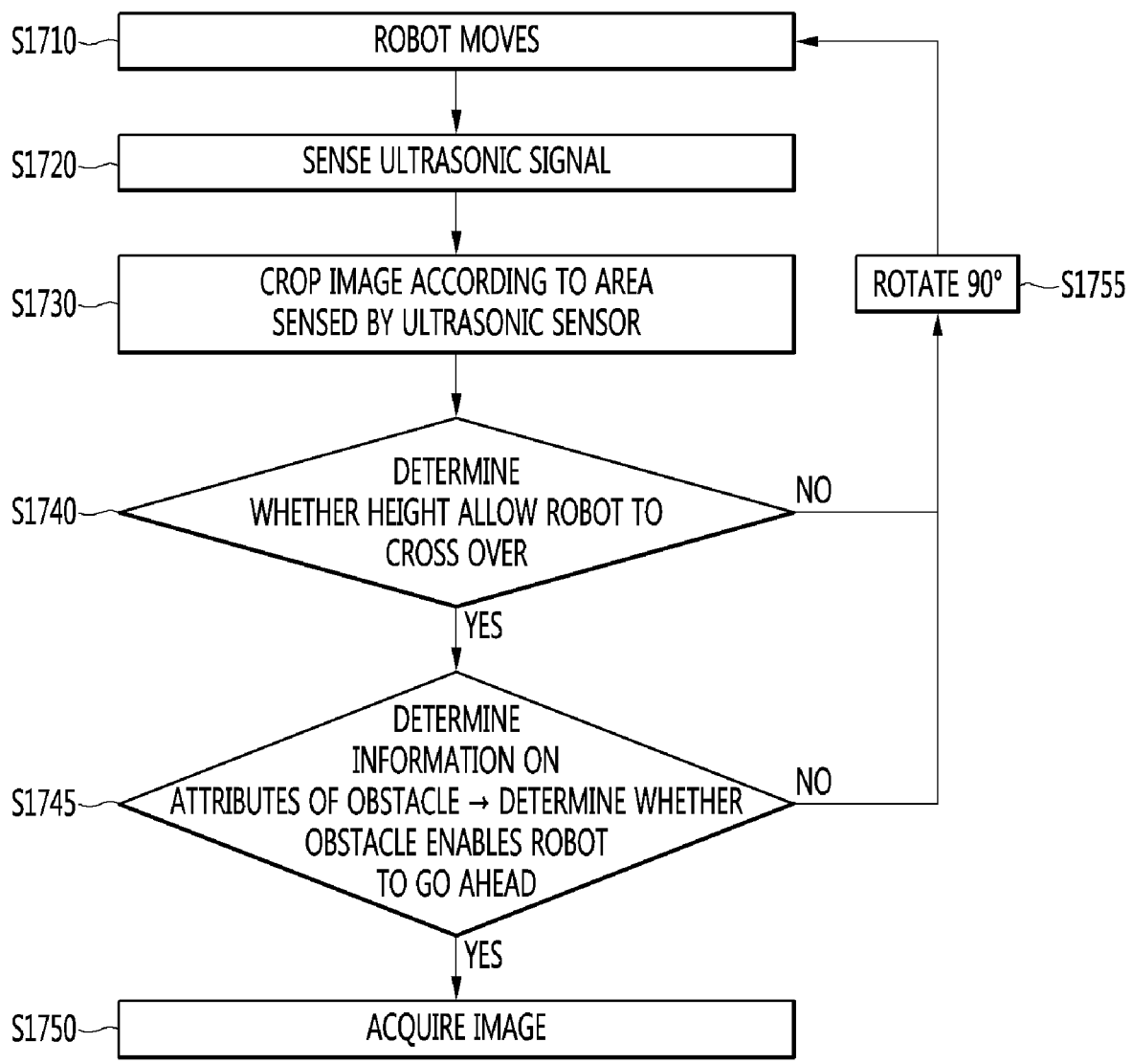
FIG. 17 is a flowchart illustrating a control method of the moving robot according to an embodiment of the present disclosure.

FIGS. 16 and 17 are flowcharts illustrating a control method of the moving robot according to an embodiment of the present disclosure. Referring to FIGS. 5 to 10 and 16, first, the moving robot 400, 400a, or 400b may move while cleaning up according to an instruction or settings (S1610).

The sensor unit 470 includes the obstacle detection sensor 431 and may detect an obstacle ahead.

If the obstacle is sensed through the sensor unit 470 during the movement of the moving robot 400, 400a, or 400b (S1620), the image acquisition unit 420 may acquire an image of the front environment of the main body 410 (S1630). In this case, the control unit 440 may perform a control operation to cut out and extract a part of the image, which is acquired by the image acquisition unit 420, corresponding to the direction of the obstacle detected by the sensor unit 470 (S1640).

According to the embodiment, the image processing module 445 in the control unit 440 can extract a part of the image. Alternatively, the control unit 440 may control the image processing unit 425, which is provided separately, to extract the part of the image. In addition, the control unit 440 may control the image acquisition unit 420 to extract the part of the image. Meanwhile, the obstacle recognition module 444 may recognize the obstacle from the extracted image, based on the data learned through the machine learning (S1650).

The obstacle recognition module 444 may include an ANN that is learned through machine learning to recognize attributes, such as the type of the obstacle and may recognize the attributes of the obstacle based on the learned data (S1650). For example, the obstacle recognition module 444 has a CNN, which is one of the deep learning structures, and the CNN may recognize the attributes of the obstacle included in the input data and may output the result.

The obstacle recognition module 444 learned through the machine learning represents a higher recognition ratio such that the learned target is mostly included in the input image data. Therefore, another area is extracted from the image acquired by the image acquisition unit 420 in the direction of the obstacle sensed by the sensor unit 470 and used as data for recognition, so the recognition ratio is increased.

Meanwhile, the traveling control module 441 may control the traveling of the traveling unit 460 based on the attributes of the recognized obstacle (S1660). For example, the traveling control module 441 may control the traveling unit 460 to bypass the obstacle when the obstacle is an obstacle having the height over which the moving robot 400, 400a, or 400b does not cross.

In addition, the traveling control module 441 may control the traveling unit 460 to continuously move straightly when the obstacle is an obstacle, such as a step having a lower height, over which the moving robot 400, 400a, or 400b is able to cross. Further, even if the obstacle is an obstacle, such as a base of an electrical fan, a human hair, a multi-tap, or an electric wire, having a lower height, if the obstacle is recognized as an obstacle, which may confine the moving robot 400, 400a, or 400b when moving, the traveling control module 441 may control the traveling unit 460 to travel by bypassing the obstacle.

Referring to FIGS. 5 to 10 and FIG. 17, first, the moving robot 400, 400a, or 400b may move according to instructions or settings (S1710). When the sensor unit 470 includes an ultrasonic sensor, the sensor unit 470 senses the reflected ultrasonic signal to recognize the obstacle (S1720). Meanwhile, the image acquisition unit 420 may continuously capture a front environment and surroundings of the moving robot 400, 400a, or 400b or may acquire an image by capturing the front environment and the surroundings of the moving robot 400, 400a, or 400b as the obstacle of the sensor unit 470 is sensed.

The control unit 440 may perform a control operation to extract an area, which corresponding to the area sensed by the ultrasonic sensor, from the image acquired by the image acquisition unit 420 (S1730). For example, the control unit 440 may perform a control operation to extract a right area from the image acquired by the image acquisition unit 420 when the area sensed by the ultrasonic signal is a front right area. In addition, the control unit may perform a control operation to extract the central area from the image acquired by the image acquisition unit 420 when the area sensed by the ultrasonic signal is the front central area.

Meanwhile, the control unit 440 may determine the attributes of the obstacle, which is sensed based on the extracted image, based on the data previously learned through the machine learning. In addition, the control unit 440 may determine whether the sensed obstacle has the height over which the moving robot 400, 400a, or 400b is able to cross (S1740).

If the sensed obstacle is an obstacle having the height over which the moving robot 400, 400a, or 400b is not able to cross (S1740), the control unit 440 may control the moving robot 400, 400a, or 400b to travel by rotating at an angle of 90° and bypassing the obstacle (S1755).

Meanwhile, if the sensed obstacle is an obstacle having the height over which the moving robot 400, 400a, or 400b is able to cross (S1740), the control unit 440 may determine the information on the attributes of the sensed obstacle (S1745). In other words, the control unit 440 may determine whether the obstacle is small to the extent that the moving robot 400, 400a, or 400b goes ahead.

If the obstacle is determined to be small to the extent that the moving robot 400, 400a, or 400b goes ahead, the control unit 440 may control the moving robot 400, 400a, or 400b to straightly move (S1750). Conventionally, it is determined whether the sensed obstacle has the height over which a moving robot is able to cross, and the moving robot straightly travels in the case of the obstacle having the lower height.

However, in the case of the obstacle such as the wire, the moving robot may be wound by the wire and restrained. In addition, when the moving robot is restrained, a motion of left-right shaking is applied to the moving robot, such that the moving robot is released from the restrained state. However, the sheath of the wire is peeled off, so that safety accident may be caused.

However, according to the present disclosure, the information on the attributes of the obstacle may be recognized through machine learning based on image information and the traveling pattern may be determined according to the recognized attributes of the obstacle, thereby improving the reliability.

Figure 18:
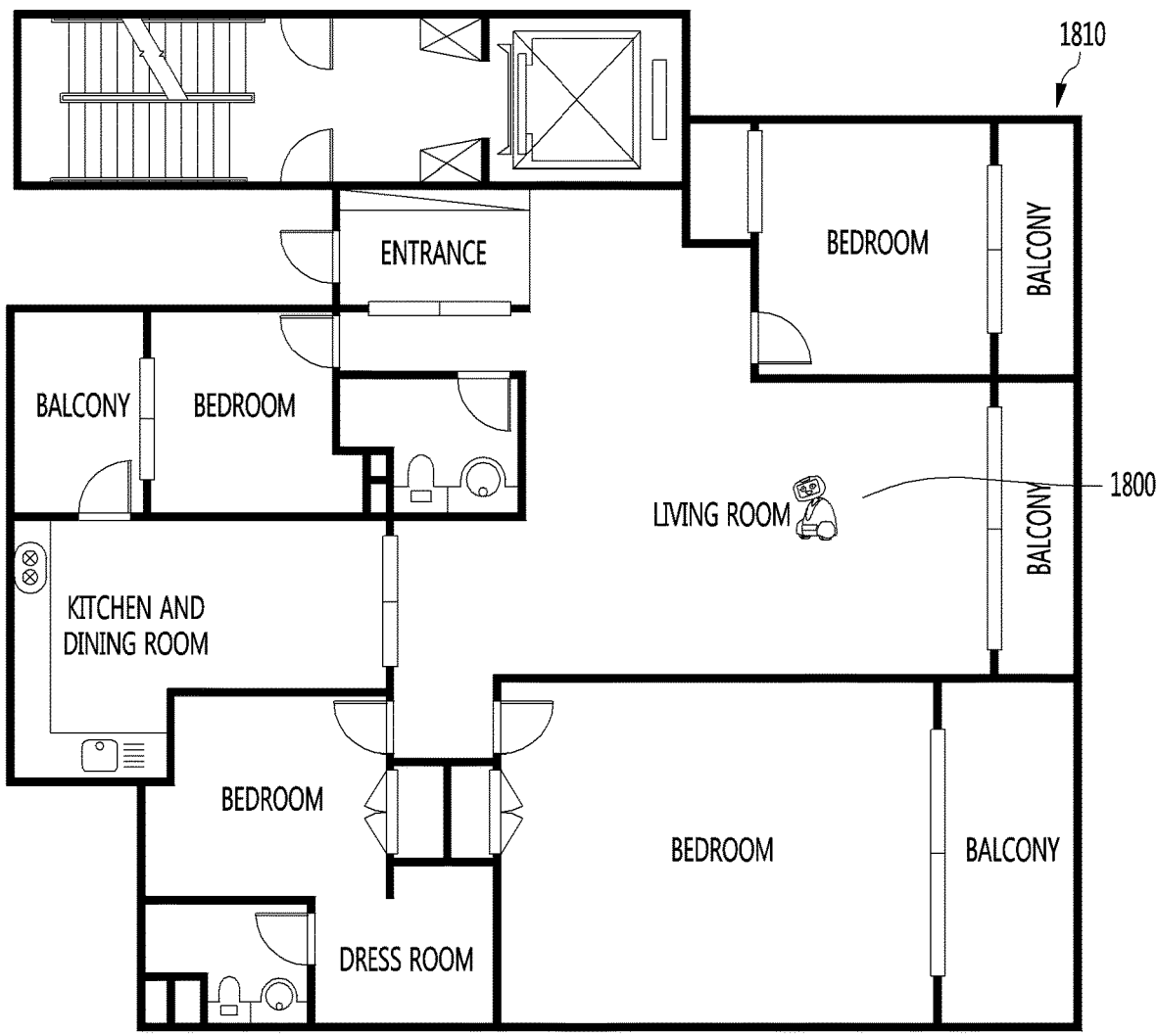
FIGS. 18 to 20 are views illustrating a first example of obstacle avoidance traveling of the moving robot according to another embodiment of the present disclosure.
Figure 19:
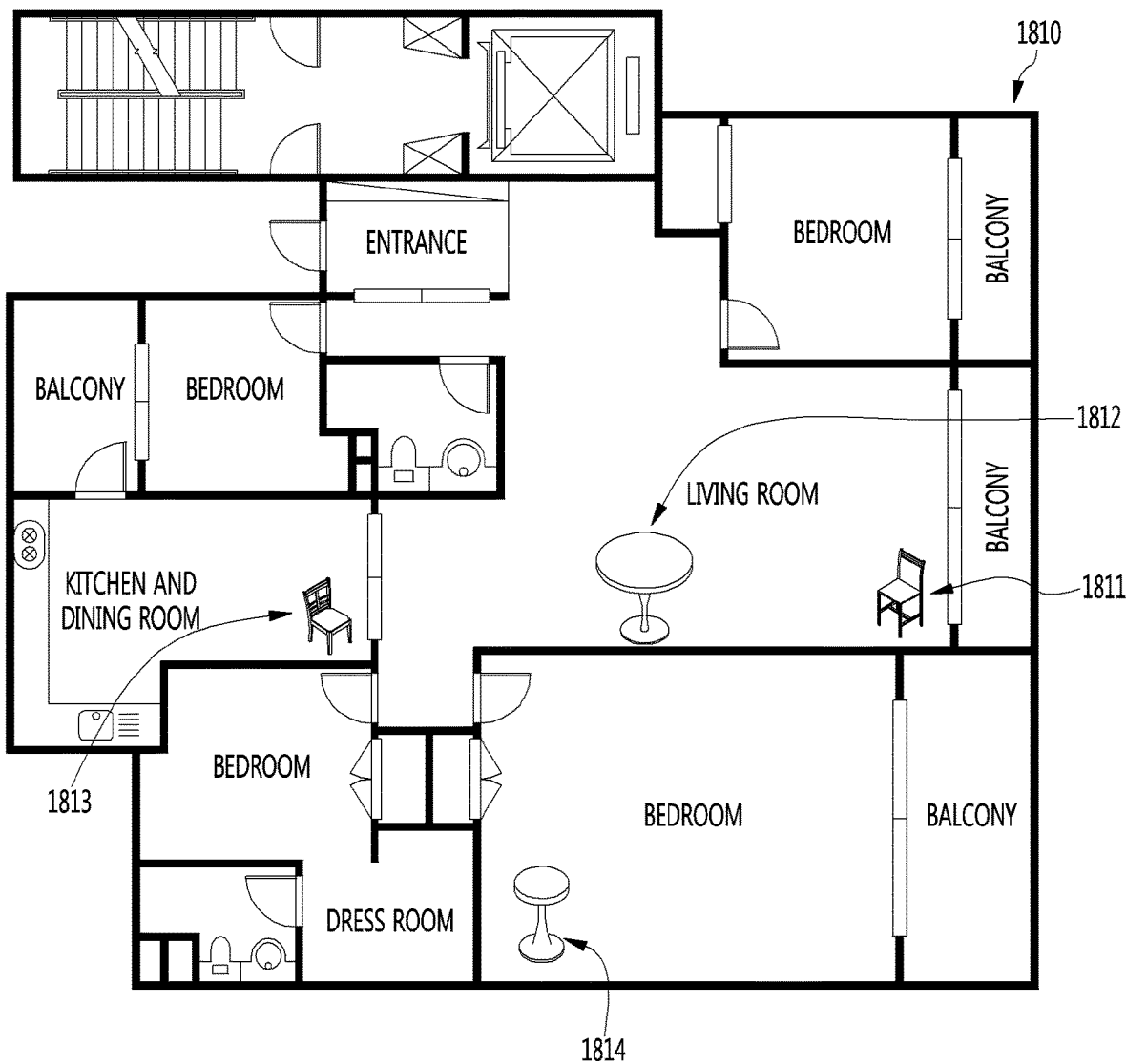
Figure 20:
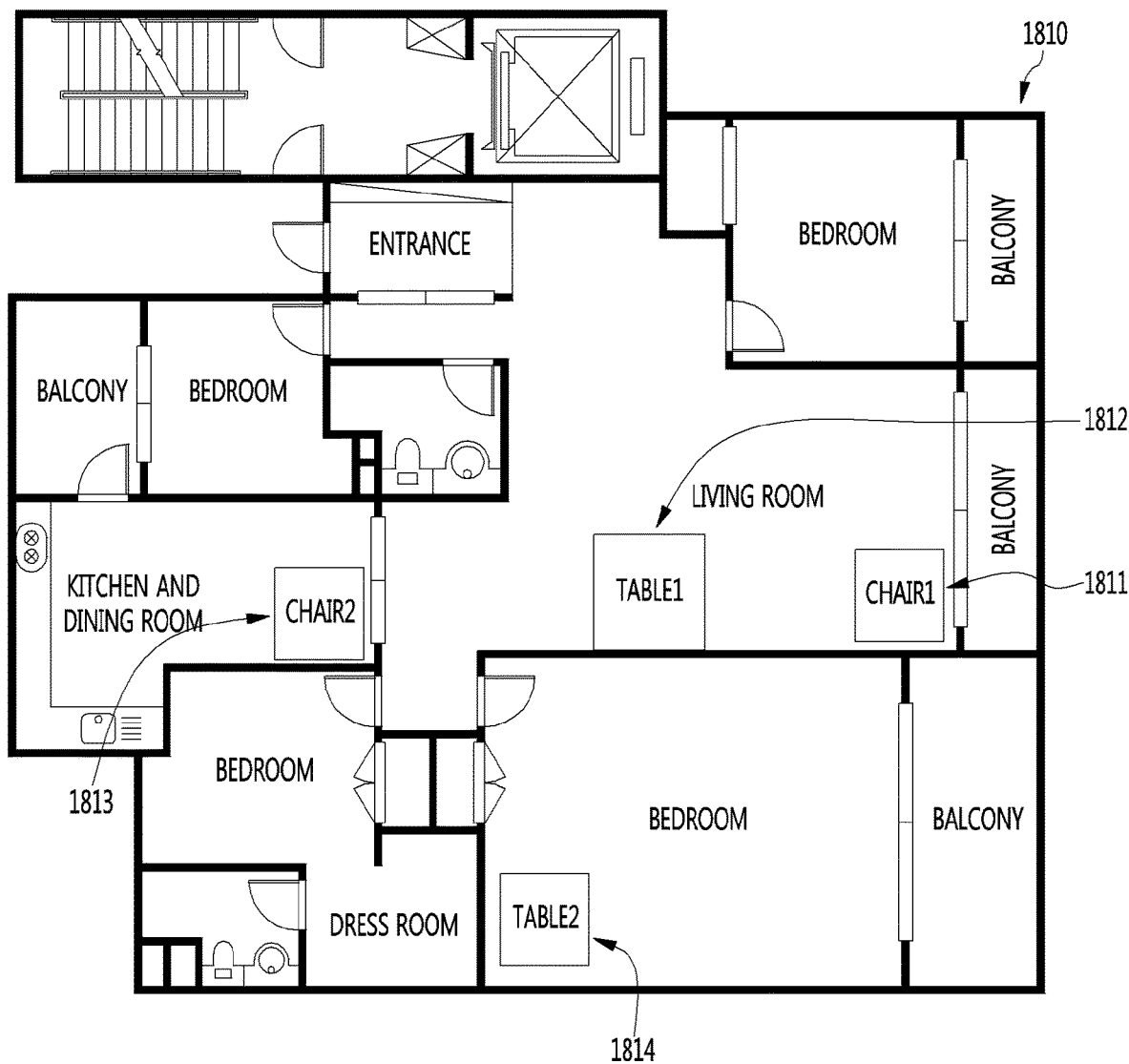

FIGS. 18 to 20 are views illustrating a first example of obstacle avoidance traveling of the moving robot according to another embodiment of the present disclosure. As illustrated in FIG. 18, a moving robot 1800 according to another embodiment of the present disclosure may store data on a map (movement map) 1810 for movement in a specific space.

The moving robot 1800 may create and store the movement map 1810 while moving in the specific space for a preset time. In addition, the moving robot 1800 may receive and store the movement map 1810 in the specific space from the external server.

In addition, as illustrated in FIG. 19, the movement map 1810 stored by the moving robot 1800 may include information on locations of obstacles 1811, 1812, 1813, and 1814. The information on the locations of the obstacles 1811, 1812, 1813, and 1814 may be received from the server. Alternatively, the moving robot 1800 moves in the specific space while directly detecting the obstacles, acquiring images of the obstacles, and creating and storing the information on the images.

In addition, the moving robot 1800 may store data including the images of the obstacles as illustrated in FIG. 19, or data formed by adding the information on the obstacles to the movement map 1810 as illustrated in FIG. 20. Accordingly, the moving robot 1800 may establish a path, which prevents the moving robot 1800 from colliding with the obstacles, based on the movement map 1810 including the information on the locations of the obstacles 1811, 1812, 1813, and 1814.

Figure 21:
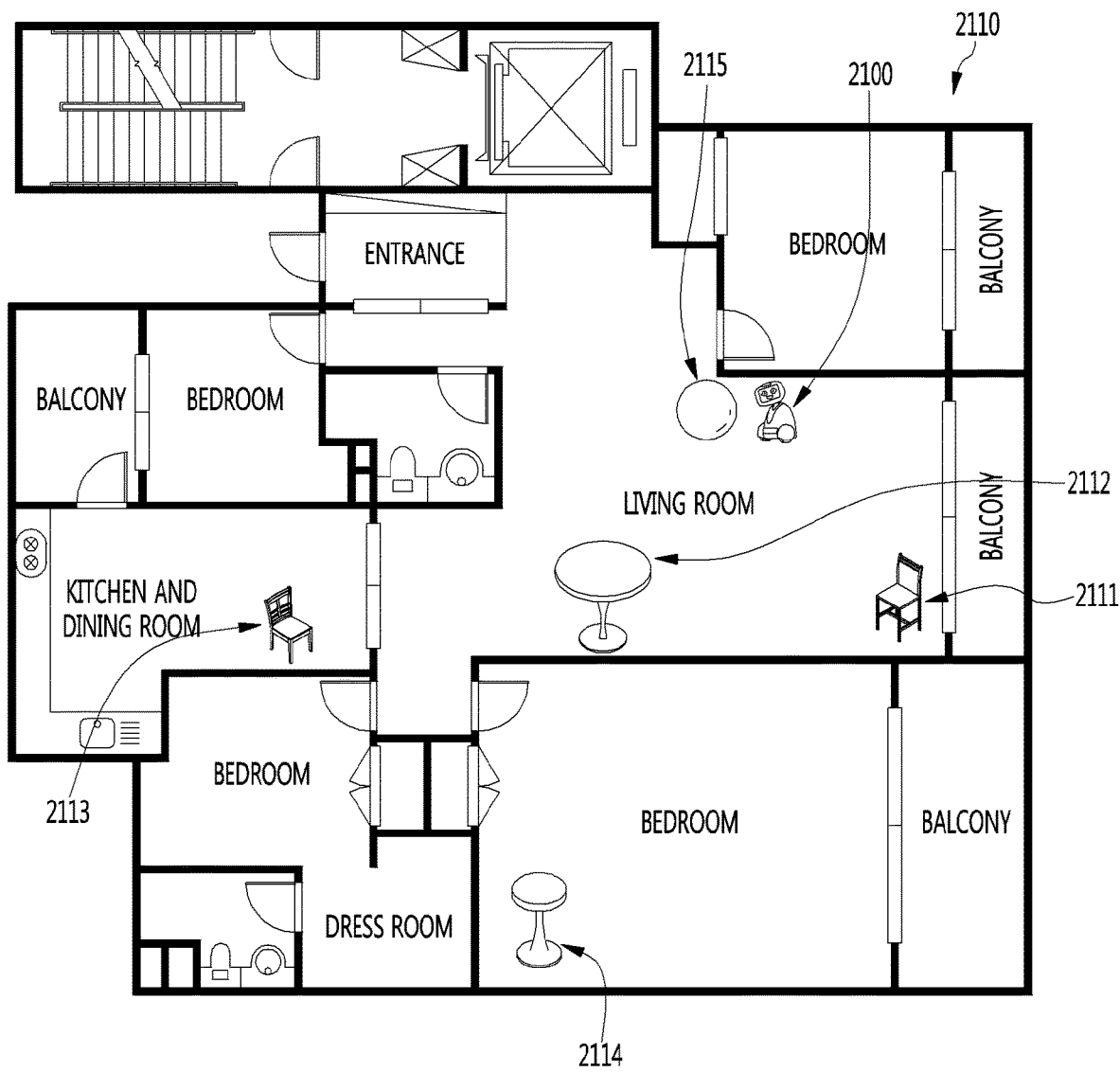
FIGS. 21 to 22 are views illustrating a second example of obstacle avoidance traveling of the moving robot according to another embodiment of the present disclosure.
Figure 22:
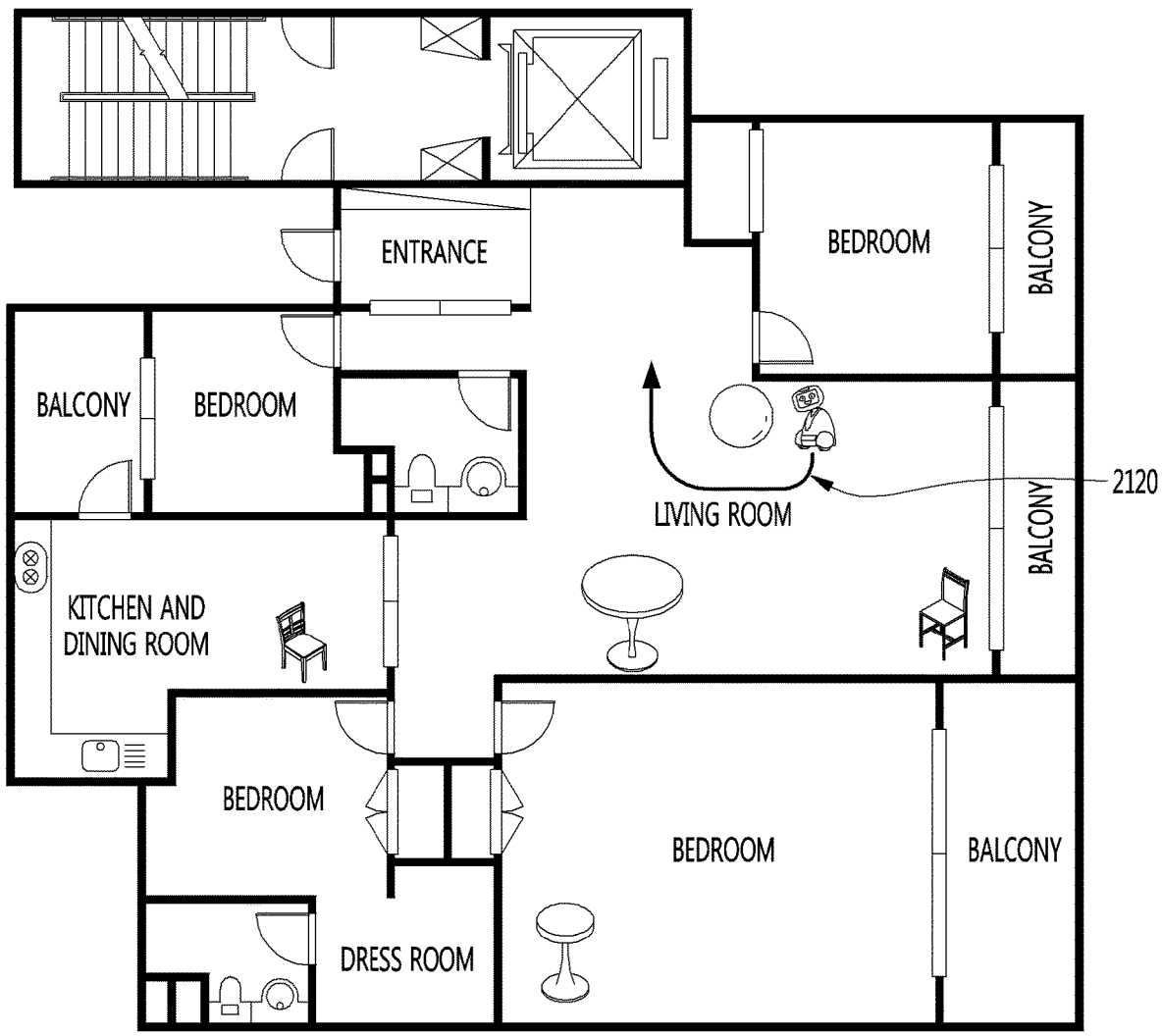

FIGS. 21 to 22 are views illustrating a second example of obstacle avoidance traveling of the moving robot according to another embodiment of the present disclosure. As illustrated in FIG. 21, a moving robot 2100 may store a movement map 2110.

The movement map 2110 may include information on locations of obstacles 2111, 2112, 2113, and 2114. The moving robot 2100 may recognize the locations of the obstacles 2111, 2112, 2113, and 2114 and may prevent the collision with the obstacles by selecting a traveling path for avoiding the relevant locations.

As illustrated in FIG. 21, the moving robot 2100 may meet a new obstacle 2115, which is not stored in the movement map 2110, on the traveling path while traveling. In this case, the moving robot 2100 may recognize the obstacle 2115 through image recognition and may detect the obstacle 2115. In addition, the moving robot 2100 may acquire an image of an area surrounding the new obstacle 2115.

Accordingly, the moving robot 2100 may newly calculate a traveling path 2120 for avoiding the obstacle 2115 based on the image of the surrounding area. As illustrated in FIG. 22, the moving robot 2100 may keep traveling to reach an original destination along the traveling path 2120 for avoiding the obstacle 2115.

Figure 23:
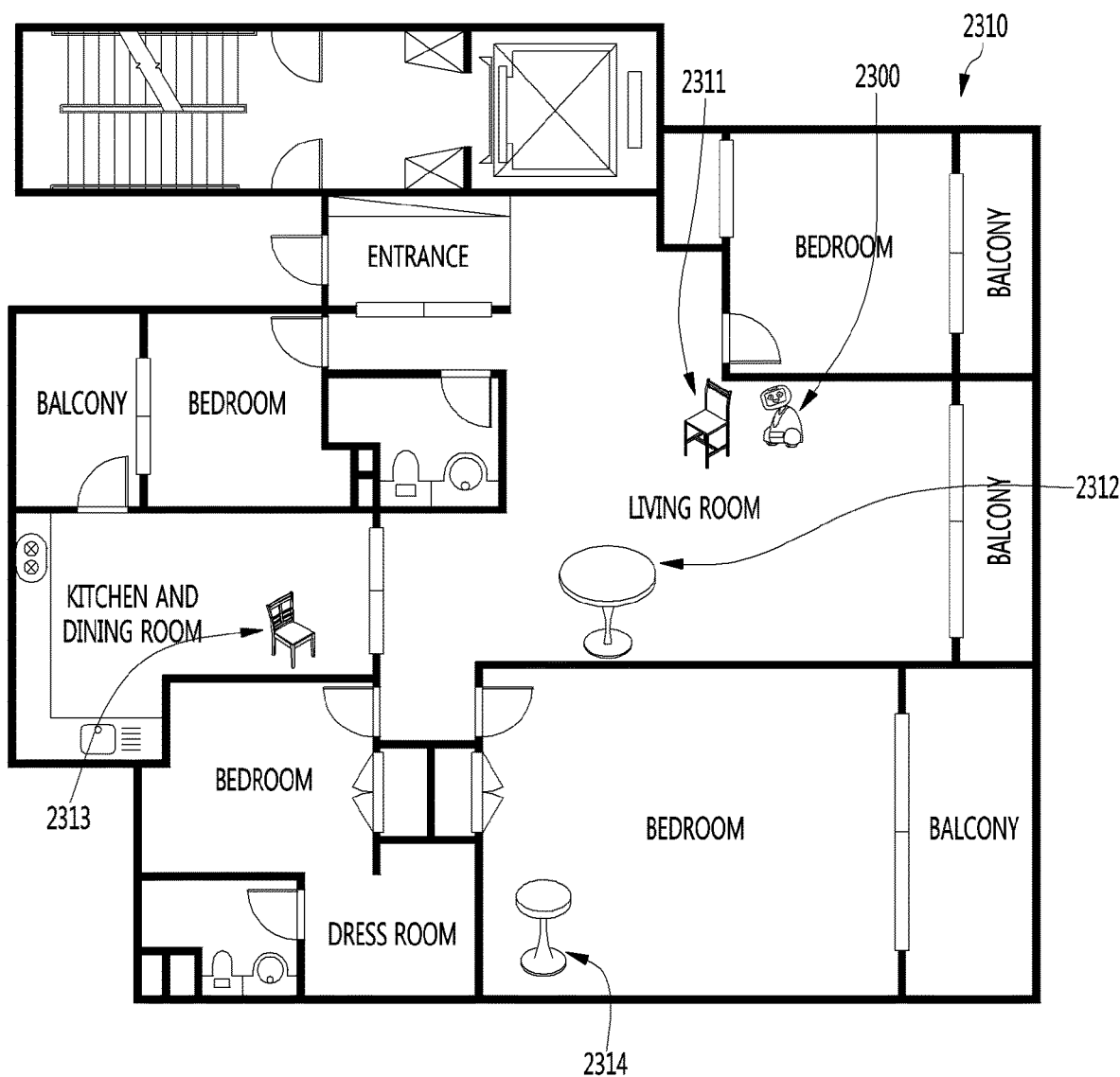
FIGS. 23 to 25 are views illustrating a first example that the moving robot according to another embodiment of the present disclosure moves an obstacle.
Figure 24:
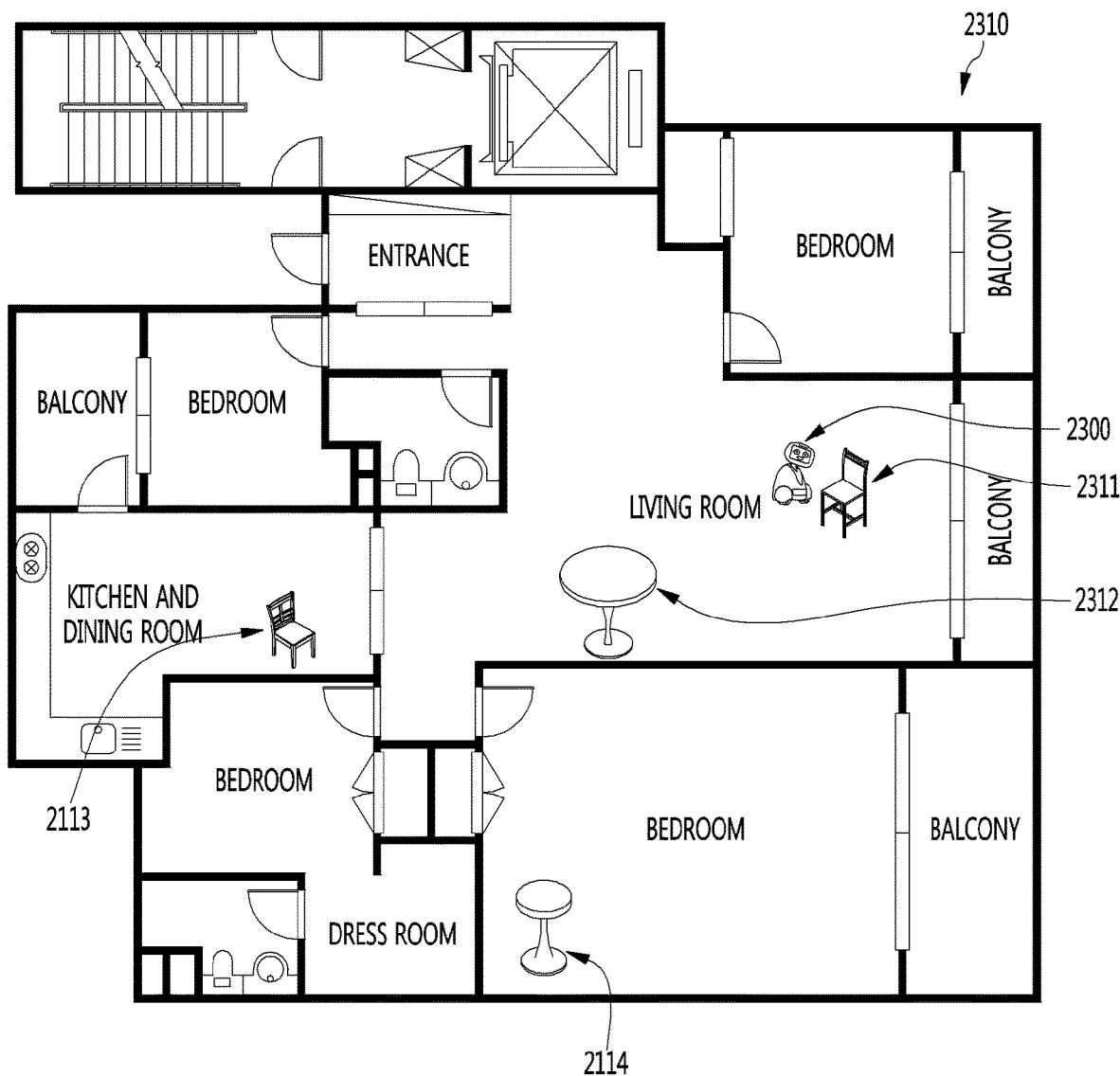
Figure 25:
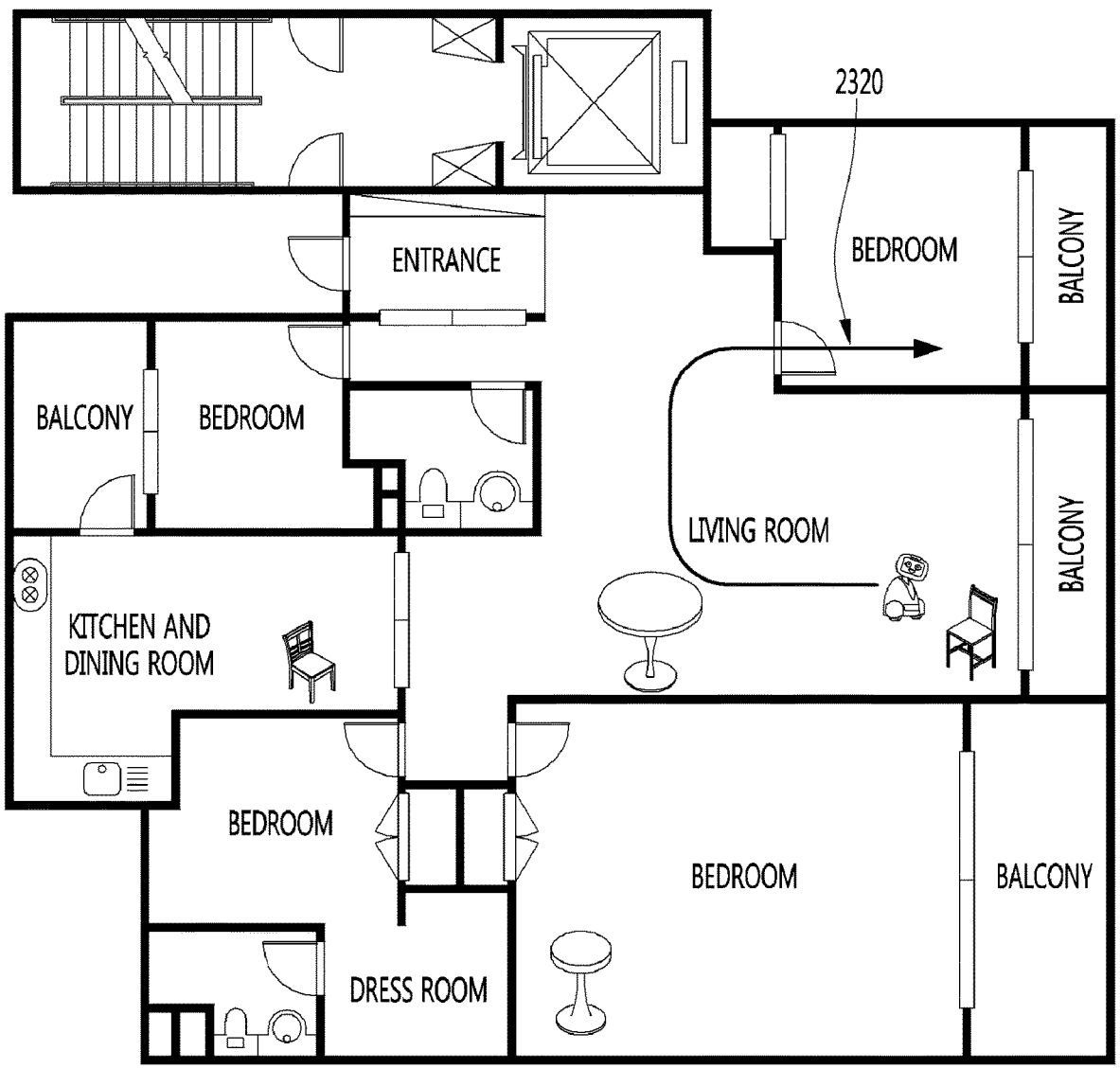

FIGS. 23 to 25 are views illustrating a first example that the moving robot according to another embodiment of the present disclosure moves an obstacle. A movement map 2310 stored by the moving robot 2300 may include information on locations of obstacles 2311, 2312, 2313, and 2314. The information on the locations of the obstacles 2311, 2312, 2313, and 2314 may be received from the server. Alternatively, the moving robot 2300 moves in the specific space while directly detecting the obstacles, acquiring images of the obstacles, and creating and storing the information on the images.

The moving robot 2300 may establish a traveling path based on the information on the locations of the obstacles 2311, 2312, 2313, and 2314. Meanwhile, as illustrated in FIG. 23, the moving robot 2300 may find out a first obstacle 2311 on the traveling path established along the movement map 2310.

The moving robot 2300 may recognize the first obstacle 2311 based on the image information. The moving robot 2300 may determine that the first obstacle 2311 is absent from a location marked on the movement map 2310 and is present at another location. In this case, the moving robot 2300 may access the movement map 2310 and search for an original location of the first obstacle 2311.

In addition, as illustrated in FIG. 24, the moving robot 2300 may move the first obstacle 2311 to the original location of the first obstacle 2311 marked on the movement map 2310. In this case, the moving robot 2300 may move the first obstacle 2311 by pushing the first obstacle 2311 through a main body of the moving robot 2300 or by using tongs of the first obstacle 2311.

As illustrated in FIG. 25, the moving robot 2300 may calculate a new traveling path 2320 from a present location to a destination, after moving the first obstacle 2311 to an originally desired location of the first obstacle 2311. In addition, the moving robot 2300 may move along the calculated new traveling path 2320.

FIGS. 26 to 29 are views illustrating a second example that the moving robot according to another embodiment of the present disclosure moves an obstacle. A movement map 2610 stored by a moving robot 2600 may include information on locations of obstacles 2611, 2612, 2613, and 2614.

The information on the locations of the obstacles 2611, 2612, 2613, and 2614 may be received from the server. Alternatively, the moving robot 2600 moves in the specific space while directly detecting the obstacles, acquiring images of the obstacles, and creating and storing the information.

Figure 26:
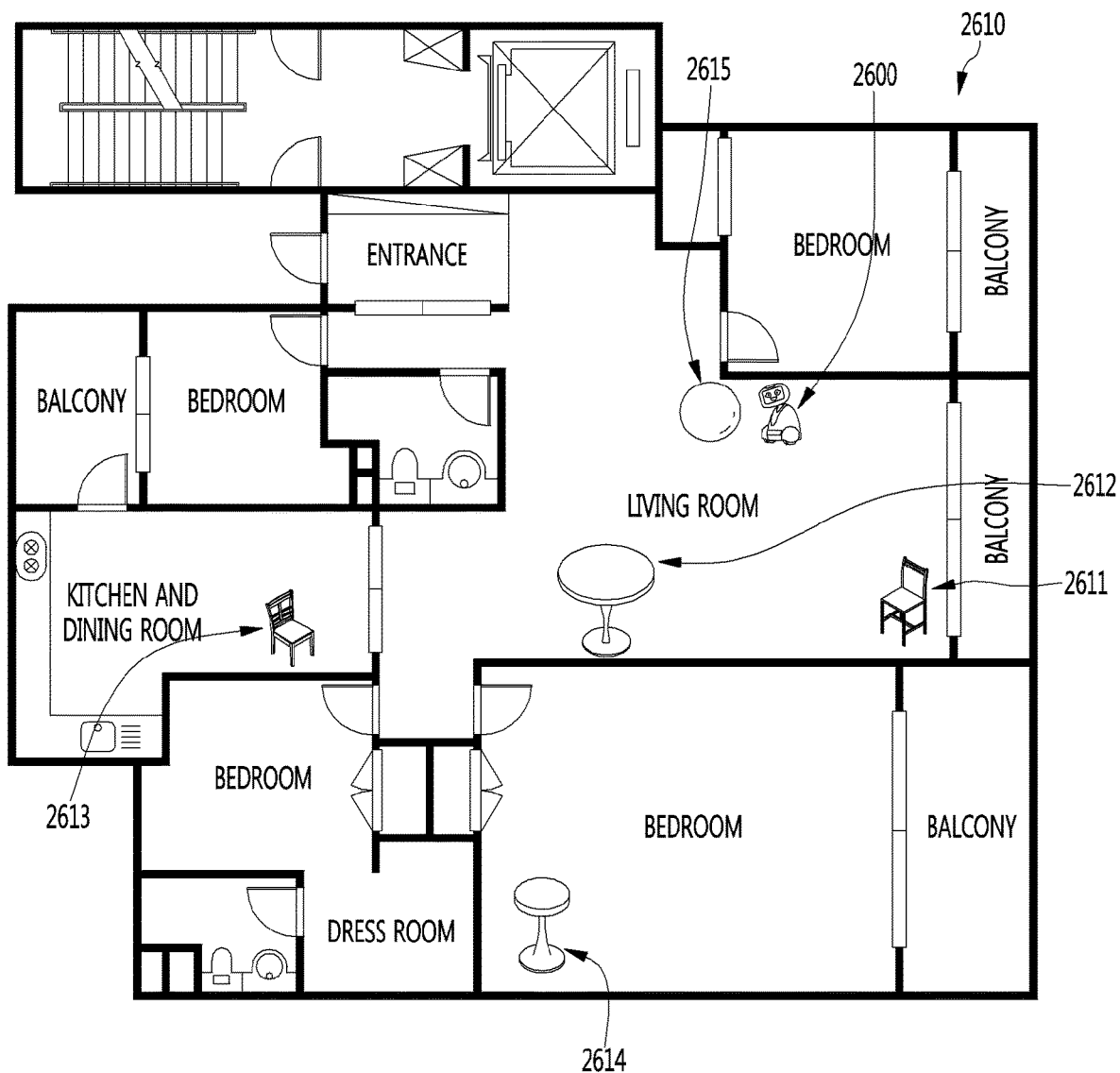
FIGS. 26 to 29 are views illustrating a second example that the moving robot according to another embodiment of the present disclosure moves an obstacle.

The moving robot 2600 may establish a traveling path based on the information on the locations of the obstacles 2611, 2612, 2613, and 2614. Meanwhile, as illustrated in FIG. 26, the moving robot 2600 may find out a new obstacle 2615 on a traveling path established along the movement map 2610.

Figure 27:
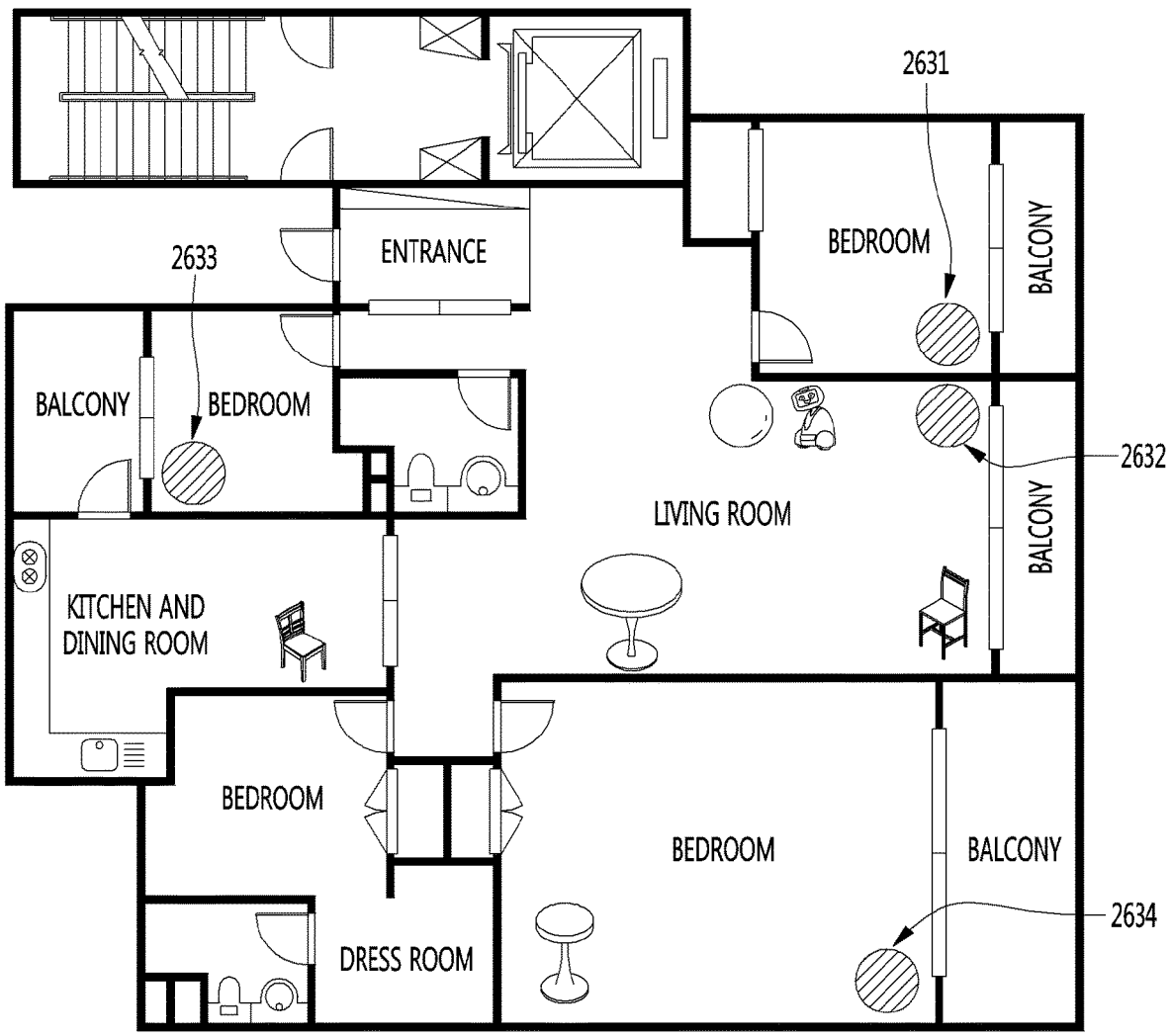

The moving robot 2600 may detect various types of information, such as a location, a size, a type, or a shape of the new obstacle 2615 through the image acquisition procedure. As illustrated in FIG. 27, the moving robot 2600 may search the movement map 2610 for locations 2631, 2632, 2633, or 2634, to which the new obstacle 2615 is to be moved, based on the information on the detected new obstacle 2615.

Figure 28:
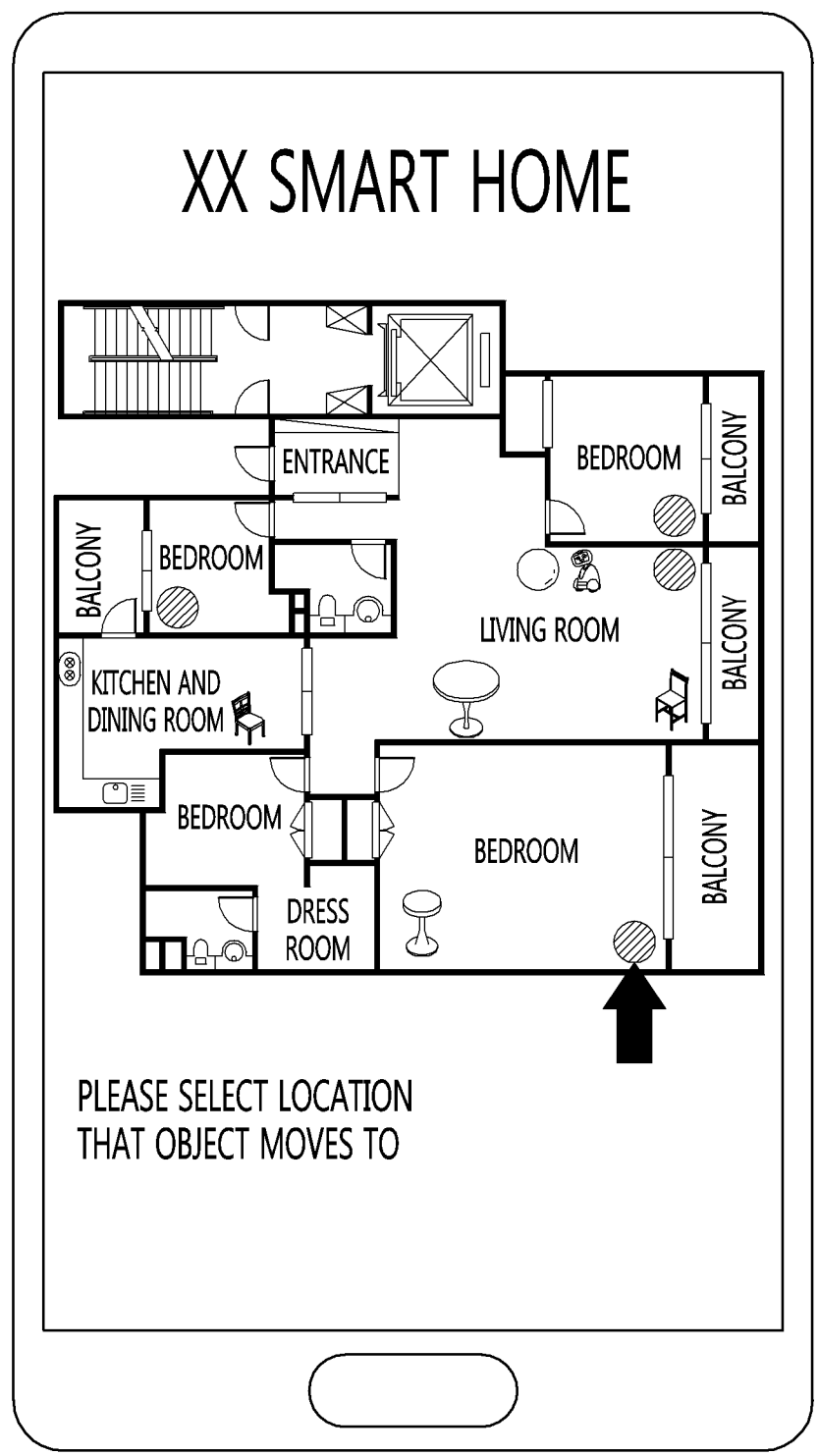

As illustrated in FIG. 28, the moving robot 2600 may transmit, to a user device 2640, a message for selecting a place to which the new obstacle 2615 is to be moved. A user may select the place, to which the new obstacle 2615 is to be moved, through the user device 2640.

Figure 29:
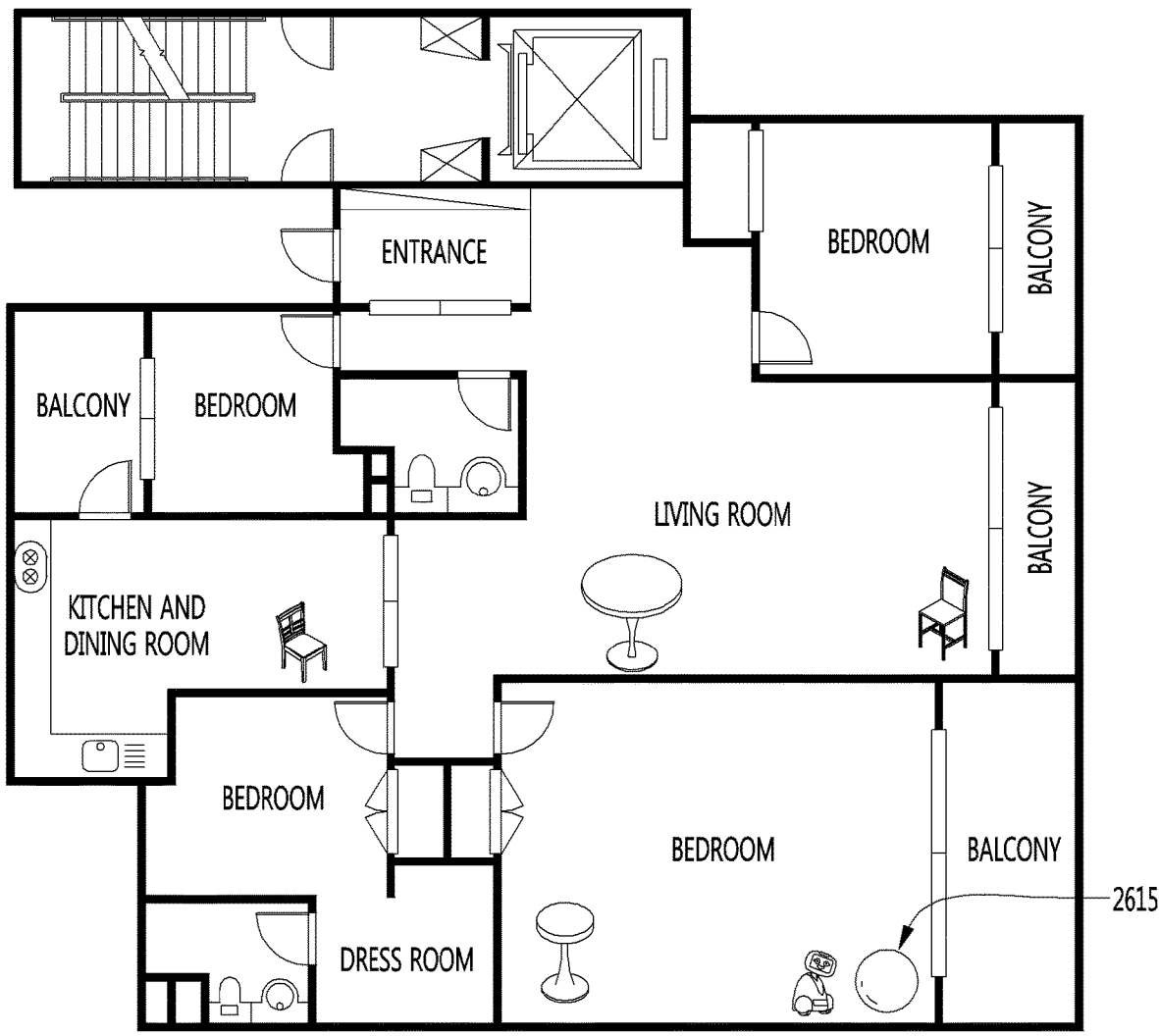

If the place 2634 to which the new obstacle 2615 is to be moved is determined, the moving robot 2600 may move the new obstacle 2615 based on the movement map 2610 as illustrated in FIG. 29. In this case, the moving robot 2600 may move the new obstacle 2615 by pushing the first obstacle 2311 through a main body of the moving robot 2600 or by using tongs of the obstacle 2611.

FIGS. 30 to 33, 34A, and 34B are views illustrating a third example that the moving robot according to another embodiment of the present disclosure moves an obstacle. A movement map 3010 stored by a moving robot 3000 may include information on locations of obstacles 3011, 3012, 3013, and 3014.

The information on the locations of the obstacles 3011, 3012, 3013, and 3014 may be received from the server. Alternatively, the moving robot 3000 moves in the specific space while directly detecting the obstacles, acquiring images of the obstacles, and creating and storing the information. The moving robot 3000 may establish a traveling path based on the information on the locations of the obstacles 3011, 3012, 3013, and 3014.

Figure 30:
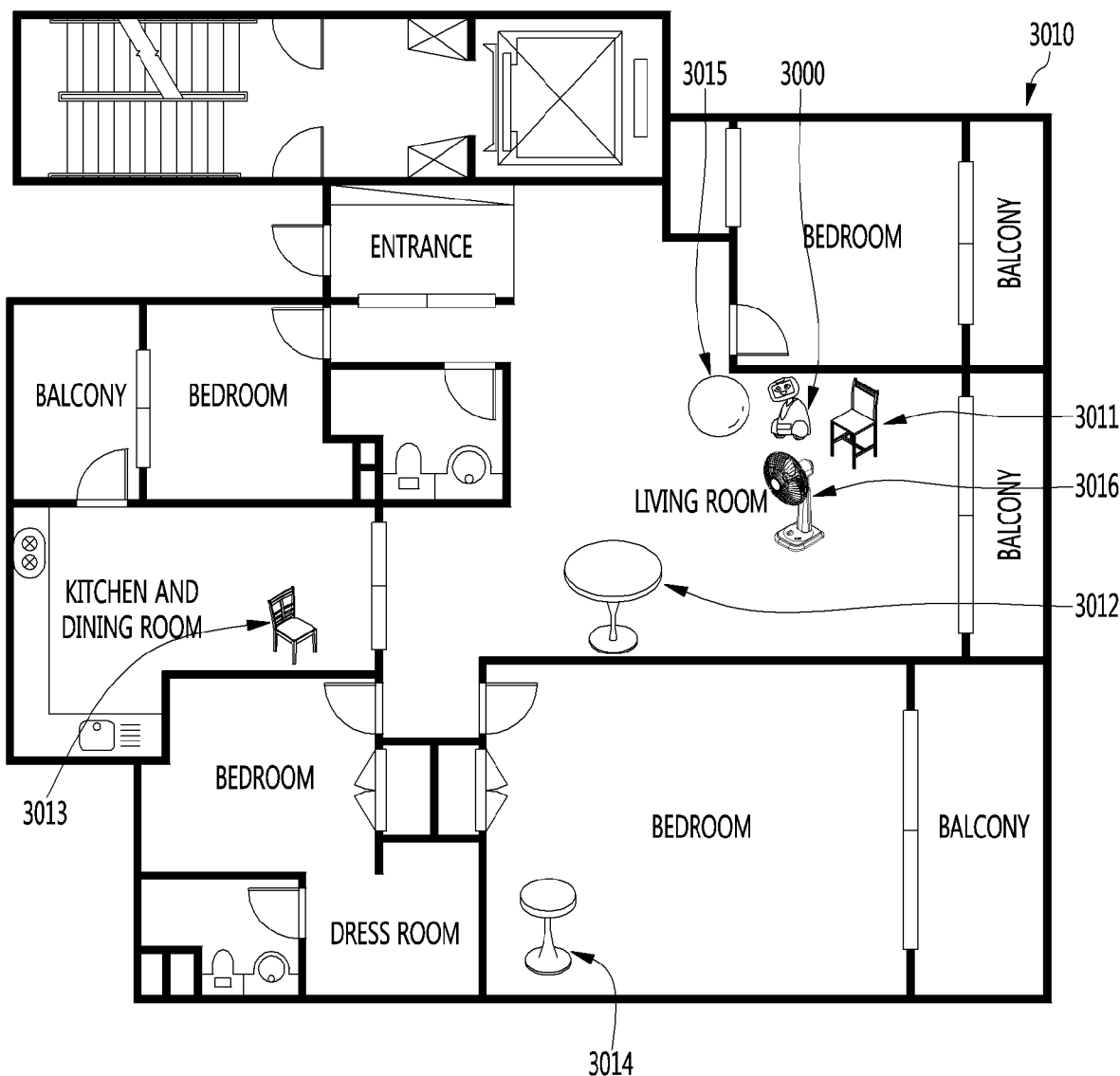

Meanwhile, as illustrated in FIG. 30, the moving robot 3000 may detect the confinement state of the obstacle 3011 on the traveling path established based on the existing movement map 3010. For example, in FIG. 30, the mobile robot 3000 may be confined by the first obstacle 3011, which is stored in the movement map 3010, and the fifth obstacle 3015 and the sixth obstacle 3016 which are not stored in the movement map 3010.

In this case, the moving robot 3000 may detect, through an image acquisition procedure, various types of information such as the locations, the size, the weight, the type and the shape of the first obstacle 3011 and the fifth and sixth obstacles 3015 and 3016 which are not stored in the movement map 3010.

Figure 31:
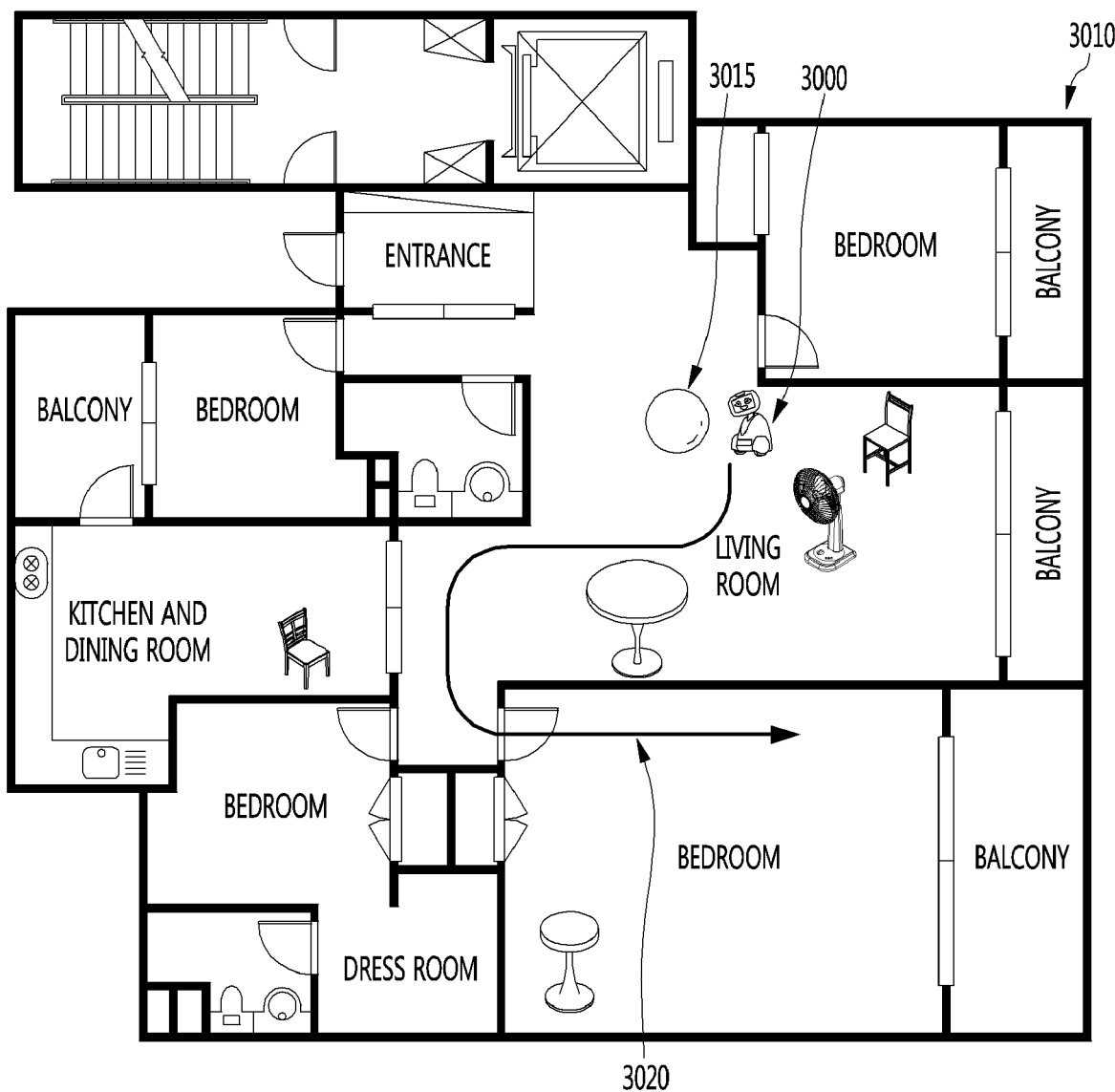

In this case, the moving robot 3000 may first select an obstacle, which is easily able to be moved, among the first obstacles 3011, the fifth obstacle 3015, and the sixth obstacle 3016. For example, as illustrated in FIG. 31, the moving robot 3000 may move the fifth obstacle 3015 formed in the shape of a ball which is easily able to be moved.

After moving the fifth obstacle 3015, the moving robot 3000 may calculate a new traveling path 3020 to an originally desired target. The moving robot 3000, which escaped from the confinement state, may move to the destination along the new traveling path 3020.

Figure 32:
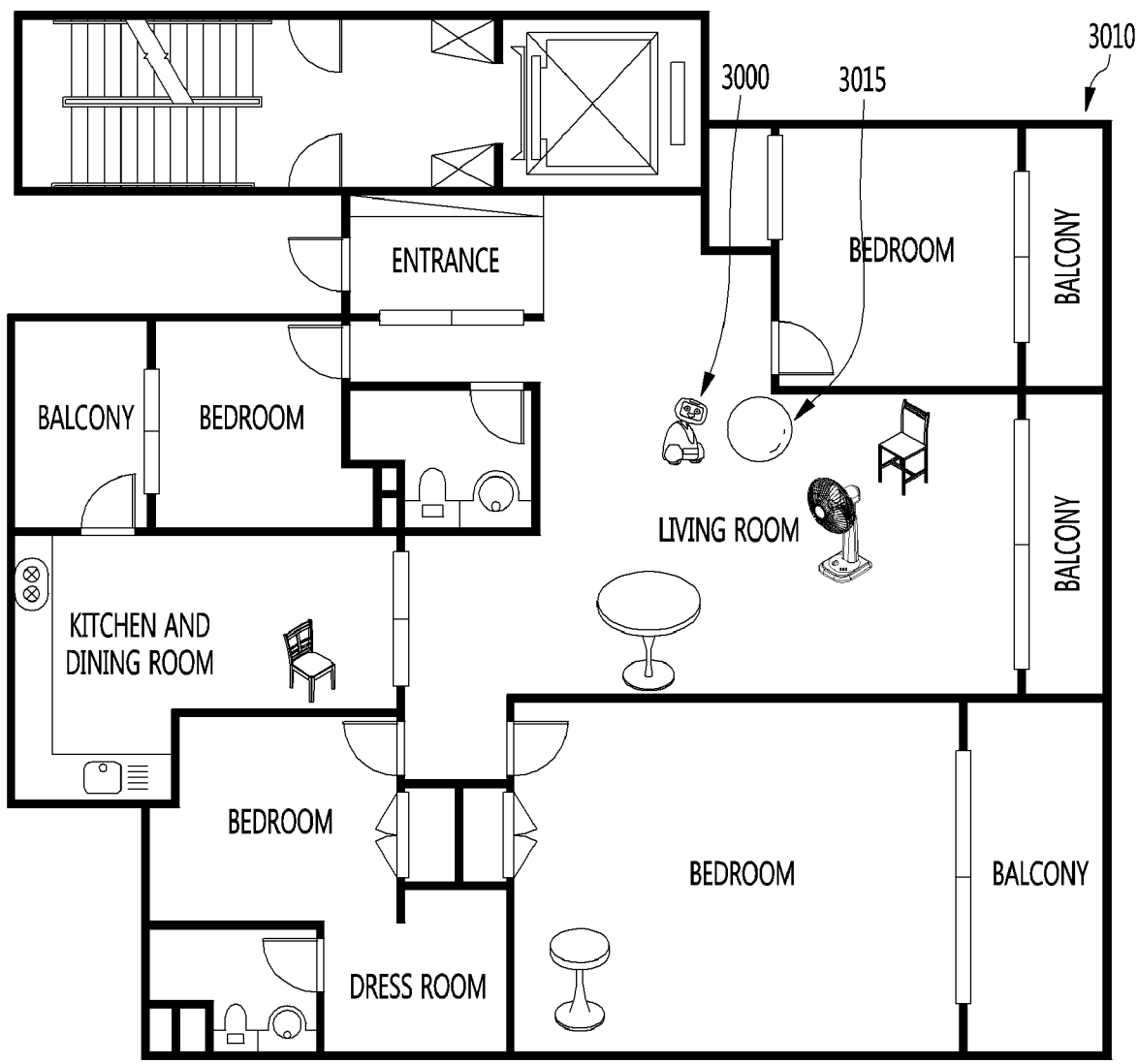

In addition, as illustrated in FIG. 32, the moving robot 3000 may return the location of the fifth obstacle 3015 to the original location thereof to escape from the confinement state. In addition, the moving robot 3000 facing the confinement state may select an obstacle, which corresponds to original location information stored in the moving robot 3000, among the first obstacle 3011, the fifth obstacle 3015, and the sixth obstacle 3016.

Figure 33:
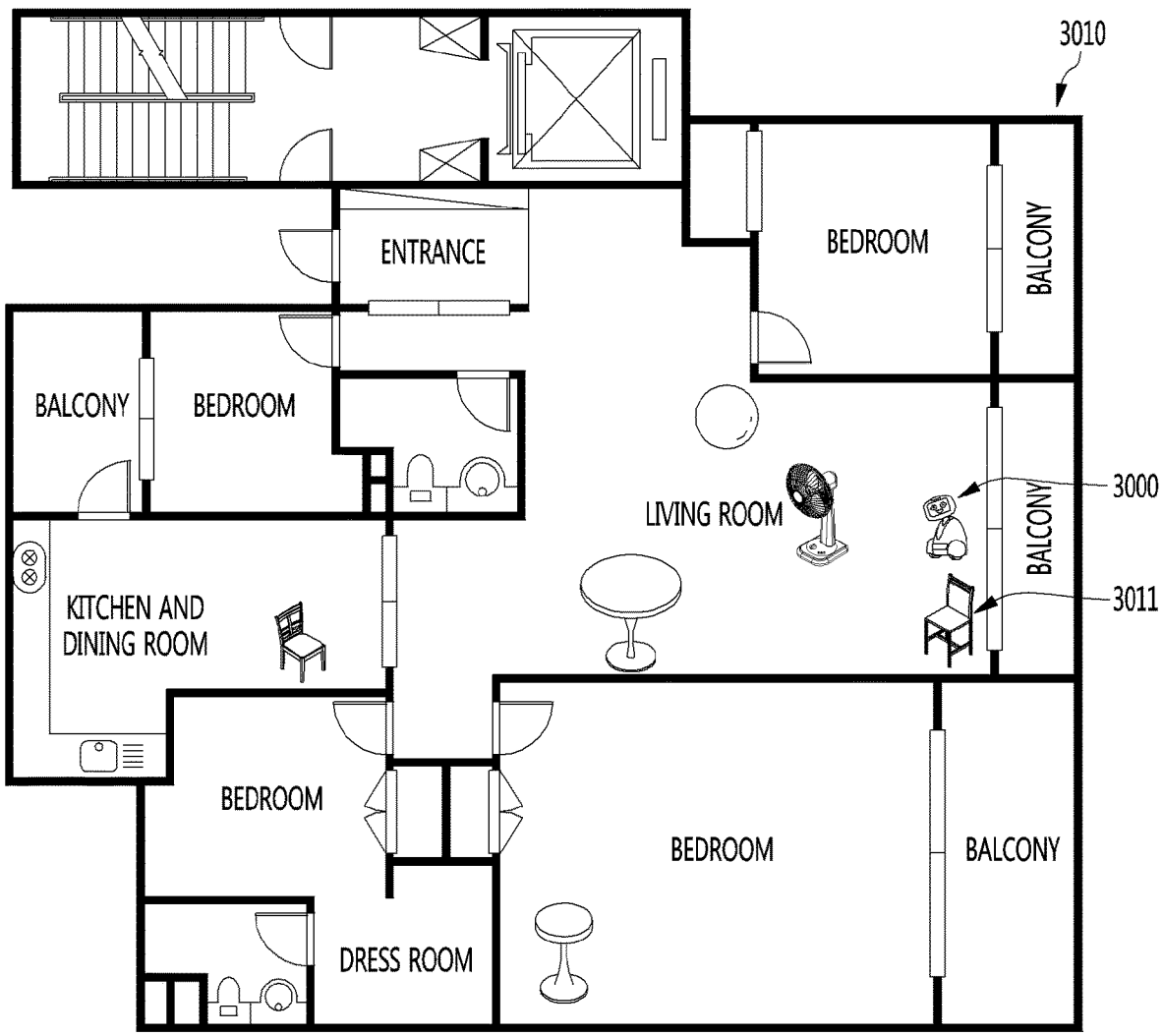

In the following description, it is assumed that the moving robot 3000 has the original location information of the first obstacle 3011 among the first obstacle 3011, the fifth obstacle 3015, and the sixth obstacle 3016. As illustrated in FIG. 33, the moving robot 3000 may move the location of the first obstacle 3011 to the original location of the first obstacle 3011 based on the movement map 3010.

In other words, the moving robot 3000 may escape from the confinement state by moving the first obstacle 3011 to the original location of the first obstacle 3011. In addition, the moving robot 3000 facing the confinement state may determine that none of the first obstacle 3011, the fifth obstacle 3015, and the sixth obstacle 3016 is able to move.

Figure 34A:
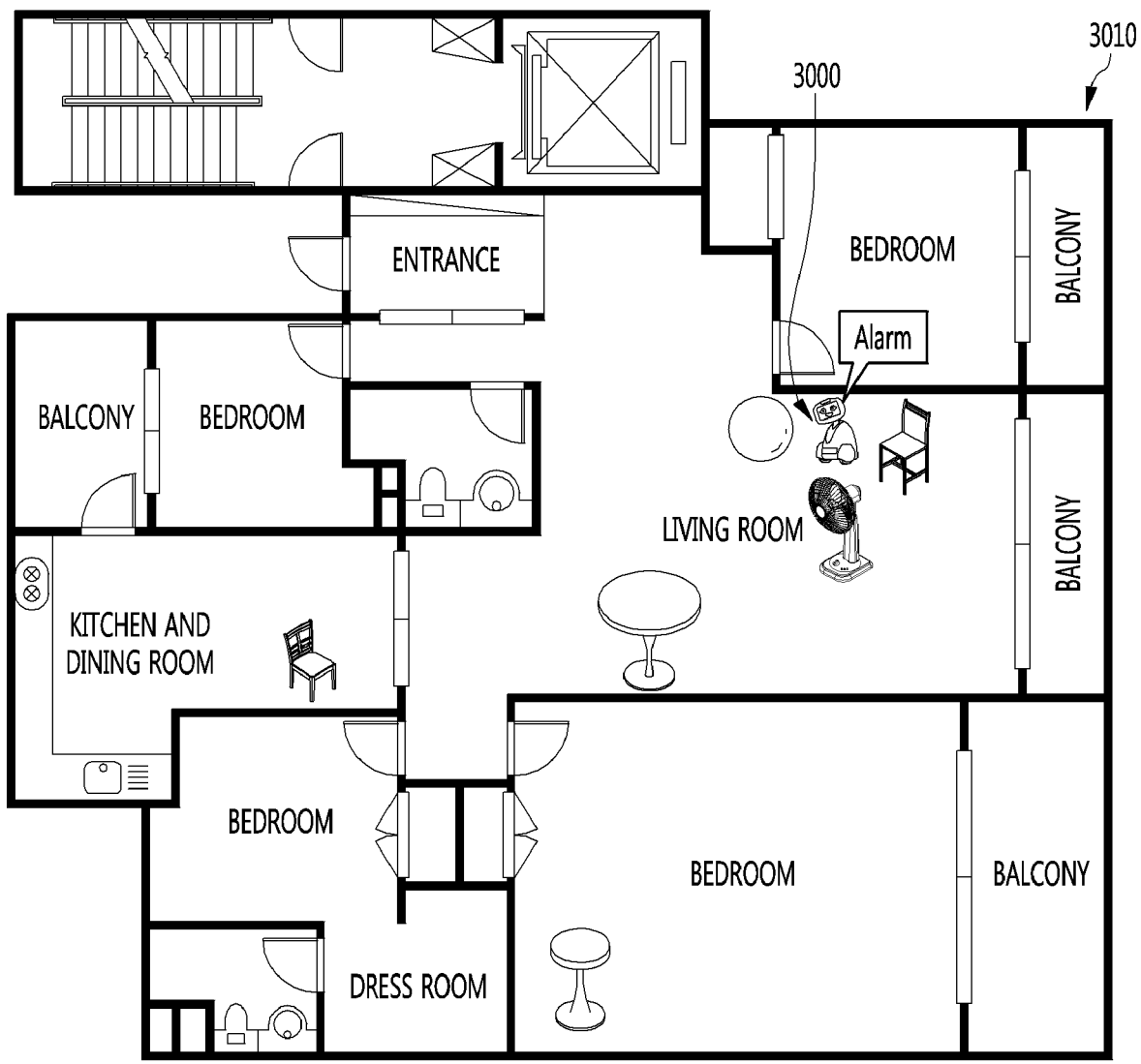

In this case, as illustrated in FIG. 34B, the moving robot 3000 may transmit a message for escaping from the confinement to a user device 3040 (shown as "Please Move Object for Robot Moving"). Accordingly, even if the moving robot 3000 is surrounded by the obstacles to face the confinement state (see FIG. 34A), the moving robot 3000 may autonomously escape from the confinement state to continuously move, which makes the technical effect according to the present disclosure.

Figure 35:
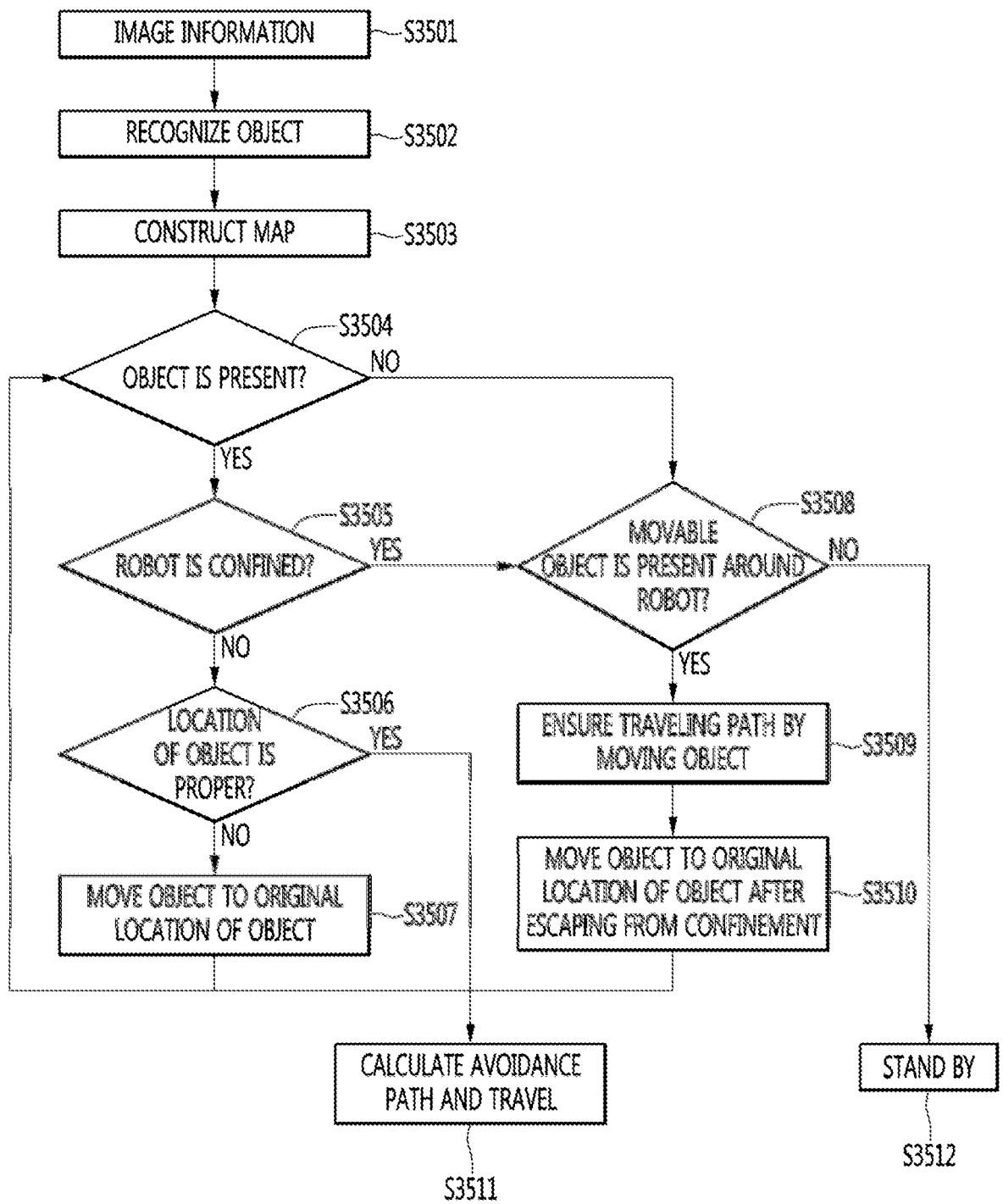
FIG. 35 is a flowchart illustrating a control method of the moving robot according to another embodiment of the present disclosure.

FIG. 35 is a flowchart illustrating a control method of the moving robot according to another embodiment of the present disclosure. As illustrated in FIG. 35, the moving robot according to another embodiment of the present disclosure may acquire image information in real time (S3501). The moving robot may recognize an object based on the image information (S3502).

The moving robot may create and store a movement map based on image information and object recognition information (S3503). The moving robot may determine whether an object, such as an obstacle, is present during travelling (S3504).

If the moving robot meets an obstacle, the moving robot may determine whether the moving robot is in a confinement state that there is no avoidance path surrounding the moving robot (S3505). If the moving robot is not in the confinement state according to the result of the determination (S3505), the moving robot may determine whether the location of the obstacle is proper (S3506).

If the location of the obstacle is proper according to the result of the determination (S3506), the moving robot may newly calculate an avoidance path and keep travelling (S3511). Meanwhile, if the location of the obstacle is not proper according to the result of the determination (S3506), the moving robot may move the obstacle to another location (S3507). In this case, if the moving robot has an original location of the obstacle, the moving robot may move the obstacle to the original location of the obstacle.

If the moving robot is in the confinement state according to the result of the determination (S3505), the moving robot may determine whether there is an obstacle, which is able to move, among obstacles confining the moving robot (S3508). If there is the obstacle, which is able to move according to the result of the determination (S3508), the moving robot may move the obstacle and ensure an avoidance path (S3509). In addition, the moving robot escaping from the confinement state may return the obstacle, which is moved, to the original location of the obstacle (S3510). Meanwhile, if there is no obstacle, which is able to move, according to the result of the determination (S3508), the moving robot may stand by in the confinement state and wait for the help of a user (S3512).

The present disclosure as described earlier may be implemented as a computer readable code in a medium having a program thereon. The computer readable medium includes all kinds of storage devices storing data that may be read by a computer system. Examples of a computer readable medium are a hard disk drive (HDD), a solid state disk (SSD), a silicon disk drive (SDD), a ROM, a RAM, a CD-ROM, a magnetic tape, a floppy disk, and an optical data storage device, and it is also implemented in the form of a carrier wave (e.g., data transmission through the Internet).

The present disclosure is provides a moving robot and a control method thereof, capable of storing location information of an obstacle to avoid the obstacle in advance. The present disclosure provides a moving robot to autonomously recognize information on an obstacle without the manual input of a user. The present disclosure provides a moving robot which autonomously escapes from the state that the moving robot is confined by a plurality of obstacles.

According to an embodiment of the present disclosure, a moving robot may include a sensor unit including one or more sensors to detect an obstacle while moving. According to an embodiment of the present disclosure, location information of the detected obstacle and location information of the moving robot may be stored if the sensor unit of the moving robot detects the obstacle.

According to an embodiment of the present disclosure, the moving robot may include a storage unit which registers, into a map, an area, which has a specific size from a location of the detected obstacle, as an obstacle area and stores an image of the obstacle area acquired by an image acquisition unit.

According to an embodiment of the present disclosure, the moving robot may autonomously detect the attributes of the obstacle through the repeated recognition and learning procedures based on machine learning. According to an embodiment of the present disclosure, the moving robot in a confinement state may autonomously move the obstacle based on the attributes of the obstacle, thereby escaping from the confinement state.

As described above, according to an embodiment of the present disclosure, the obstacle is detected by the sensor unit, and the location information of the obstacle is stored in the form of a map, thereby preventing the collision with the obstacle in advance. In addition, according to an embodiment of the present disclosure, the attributes of the obstacle may be autonomously through the repeated recognition and learning procedure based on machine learning, so that the user convenience may be increased.

Further, according to an embodiment of the present disclosure, the moving robot in the confinement state may autonomously move the obstacle based on the attributes of the obstacle, thereby escaping from the confinement state. Accordingly, even if a user is absent, the moving robot may continuously and autonomously travel.

Thus, the detailed description should not be construed as limitative in all aspects and should be considered exemplary. The scope of the prevent disclosure should be defined by the reasonable understanding of the following claims and all changes falling within the equivalent scope of the prevent disclosure are included in the scope of the prevent disclosure.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A moving robot comprising:
  a motor that selectively provides a driving force to move a main body of the moving robot;
  a camera that acquires images of regions outside the main body;
  a sensor that detects obstacles;
  a memory that stores information on a location of one of the sensed obstacles, designates, in a map, an area having a prescribed size and includes the location of the obstacle as an obstacle area, and stores one of the images that is associated with the obstacle area; and
  a controller that:
    identifies an attribute of the obstacle based on the stored image associated with the obstacle area,
    determines, when the moving robot is in a confinement state in which possible traveling paths are blocked, whether the obstacle is movable based on the attribute, and
    controls, when the obstacle is movable, the motor to provide the driving force to move the obstacle,
    wherein the controller registers, into the map, the obstacle, as one of a dangerous obstacle or a non-dangerous obstacle according to the attribute of the obstacle, and wherein the dangerous obstacle has a height over which the moving robot cannot go, and the non-dangerous obstacle has a height over which the moving robot can go.

2. The moving robot of claim 1, wherein the controller further identifies respective attributes for the obstacles based on the images, and selects one of the obstacles which is most easily moved to be moved based on the respective attributes, wherein the respective attributes relate to at least one of a size, a weight, or a shape of the obstacles.

3. The moving robot of claim 1, wherein, if a particular one of the obstacles is previously registered in the map stored in the memory, the controller controls the motor to first select and move the previously-registered obstacle.

4. The moving robot of claim 3, wherein the controller controls the motor to move the previously-registered obstacle into an associated obstacle area registered into the map when moving the previously-registered obstacle.

5. The moving robot of claim 1, wherein the controller further calculates a new traveling path to a destination when moving the obstacle causes the confinement state to be released.

6. The moving robot of claim 1, wherein the sensor is mounted on a top surface of the moving robot.

7. The moving robot of claim 1, wherein the controller further selects a location based on the map, and controls the motor to move the obstacle to the selected location.

8. The moving robot of claim 1, further comprising a communications interface that transmits, to a user device, a message prompting a user to identify a location for moving the obstacle, wherein controller controls the motor to move the obstacle to the identified location.

9. The moving robot of claim 1, wherein the controller, when identifying the attribute of the obstacle, sequentially recognizes attributes of the obstacle from the stored image associated with the obstacle area based on previously learned data through machine learning, and identifies, as the attribute of the obstacle, a final attribute of the sequentially recognized attributes.

10. The moving robot of claim 9, wherein the controller repeatedly compares a present obstacle recognition result with a previous obstacle recognition result, when sequentially recognizing the attributes of the obstacle from the stored images.

11. The moving robot of claim 10, wherein the controller:
maintains the present obstacle recognition result and increases a confidence value by reflecting a specific weight, if the present obstacle recognition result is identical to the previous obstacle recognition result through the comparison of the present obstacle recognition result with the previous obstacle recognition result; and
registers one, which represents a higher confidence value, of the present obstacle recognition result and the previous obstacle recognition result as a new present obstacle recognition result, if the present obstacle recognition result is not identical to the previous obstacle recognition result.

12. The moving robot of claim 10, wherein the controller determines a final present recognition result as the final attribute of the obstacle when obstacle recognition is completed with respect to the obstacle area.

13. A moving robot comprising:
a motor that selectively provides a driving force to move a main body of the moving robot;
a camera that acquires images of regions outside the main body;
a sensor that detects obstacles; and
a controller that:
recognizes respective attributes of the obstacles based on the images,
selects one of the obstacles based on the respective attributes when the moving robot is in a confinement state in which possible traveling paths are blocked, and
controls the motor to apply the driving force toward the selected obstacle to unblock one of the traveling paths and to move the moving robot along the unblocked traveling path,
wherein the controller registers, into the map, the obstacle, as one of a dangerous obstacle or a non-dangerous obstacle according to the attribute of the obstacle, and
wherein the dangerous obstacle has a height over which the moving robot cannot go, and the non-dangerous obstacle has a height over which the moving robot can go.

14. The moving robot of claim 13, wherein the controller, when identifying the attribute of one of the obstacles, sequentially recognizes attributes of the obstacle from one of the images associated with the obstacle area based on previously learned data through machine learning, and identifies, as the attribute of the obstacle, a final attribute of the sequentially recognizes attributes.

15. The moving robot of claim 13, wherein the respective attributes relate to at least one of a size, a weight, or a shape of the obstacles.

16. The moving robot of claim 13, wherein the controller further selects a location based on a map of regions outside the main body, and controls the motor to move the selected obstacle to the selected location.

17. The moving robot of claim 13, further comprising a communications interface that transmits, to a user device, a message prompting a user to identify a location for moving the selected obstacle, wherein controller controls the motor to move the selected obstacle to the identified location.

18. The moving robot of claim 13, wherein the controller, when recognizing the respective attributes of the obstacles based on the images, is further to identify respective locations associated with the obstacles, identify a portion of the images associated with the respective locations associated with the obstacles, and process the portion of the images to recognize the respective attributes.

19. A moving robot comprising:
a motor that selectively provides a driving force to move a main body of the moving robot;
a camera that acquires images of regions outside the main body;
a sensor that detects obstacles; and
a controller that:
recognizes respective attributes of the obstacles based on the images,
selects one of the obstacles based on the respective attributes when the moving robot is in a confinement state in which possible traveling paths are blocked, and
controls the motor to apply the driving force toward the selected obstacle to unblock one of the traveling paths and to move the moving robot along the unblocked traveling path,
wherein the controller, when recognizing the respective attributes of the obstacles based on the images, is further to identify respective locations associated with the obstacles, identify a portion of the images associated with the respective locations associated with the obstacles, and process the portion of the images to recognize the respective attributes.

\* \* \* \* \*